United States Patent
Koo et al.

(10) Patent No.: US 10,317,133 B2
(45) Date of Patent: *Jun. 11, 2019

(54) REFRIGERATOR

(71) Applicant: Samsung Electronics Co., Ltd., Suwon-si, Gyeonggi-do (KR)

(72) Inventors: Keon Pyo Koo, Hwaseong-si (KR); Yong Bum Seo, Hwaseong-si (KR); Chun Youp Shin, Suwon-si (KR); Woo Yeol Yoo, Suwon-si (KR); Jeong Hyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,362

(22) Filed: Mar. 26, 2018

(65) Prior Publication Data

US 2018/0209722 A1 Jul. 26, 2018

Related U.S. Application Data

(63) Continuation of application No. 15/700,856, filed on Sep. 11, 2017, now Pat. No. 9,958,199, which is a (Continued)

(30) Foreign Application Priority Data

Sep. 1, 2015 (KR) .................. 10-2015-0123373
Dec. 28, 2015 (KR) .................. 10-2015-0187980

(51) Int. Cl.
*F25D 23/02* (2006.01)
*F25D 29/00* (2006.01)
*G06F 3/041* (2006.01)

(52) U.S. Cl.
CPC .......... *F25D 29/005* (2013.01); *F25D 23/02* (2013.01); *G06F 3/0412* (2013.01); *F25D 2400/361* (2013.01)

(58) Field of Classification Search
CPC ...... F25D 29/005; F25D 23/02; F25D 23/028; F25D 2323/02; F25D 2400/36; F25D 2400/361
See application file for complete search history.

(56) References Cited

U.S. PATENT DOCUMENTS 9,829,241 B2 * 11/2017 Seo .................. F21V 14/003
9,958,199 B2 * 5/2018 Koo .................. F25D 29/005
(Continued)

FOREIGN PATENT DOCUMENTS

EP 2813884 12/2014
EP 3018438 5/2016
(Continued)

OTHER PUBLICATIONS

International Search Report dated Nov. 24, 2016 in corresponding International Patent Application No. PCT/KR2016/009096.
(Continued)

*Primary Examiner* — Daniel J Rohrhoff
(74) *Attorney, Agent, or Firm* — Staas & Halsey LLP

(57) ABSTRACT

Disclosed is a refrigerator having an improved structure with a display unit. The refrigerator comprises a main body, a storeroom arranged inside the main body with an open front, a door pivotally connected to the main body for opening or closing the open front of the storeroom and a display unit installed on the door. The display unit comprises a display for displaying images, a display glass located on the front of the display to have an area larger than the display and form a touch screen, a display case with a display mounter for the display to be mounted therein, a display unit case fixedly
(Continued)

connected to the door and a fixing unit for fixedly connecting the display case to the display unit case by pressing a part of the display case.

15 Claims, 33 Drawing Sheets

Related U.S. Application Data continuation of application No. PCT/KR2016/009096, filed on Aug. 18, 2016.

(56) References Cited

U.S. PATENT DOCUMENTS

| | | | |
|---|---|---|---|
| 2010/0043466 | A1 | 2/2010 | Oh et al. |
| 2015/0052920 | A1* | 2/2015 | Park ............... F25D 29/005 62/126 |
| 2015/0276302 | A1* | 10/2015 | Roh ............. G02F 1/133377 62/56 |
| 2016/0178276 | A1* | 6/2016 | Park ............... F25D 29/005 345/173 |
| 2017/0059875 | A1* | 3/2017 | Seung ........... G02F 1/133553 |
| 2017/0153055 | A1* | 6/2017 | Hong ............... F25D 23/028 |
| 2017/0191745 | A1* | 7/2017 | Choi ............... H05B 37/0281 |
| 2017/0191747 | A1* | 7/2017 | Seo ................. F21V 14/003 |
| 2017/0261248 | A1* | 9/2017 | Koo ................. F25D 17/04 |
| 2018/0189027 | A1* | 7/2018 | Jeon ............... A47F 3/0434 |
| 2018/0274846 | A1* | 9/2018 | Kim ............... F25D 21/04 |
| 2018/0274852 | A1* | 9/2018 | Kang ............. F25D 27/005 |

FOREIGN PATENT DOCUMENTS

| | | |
|---|---|---|
| JP | 2014-206321 | 10/2014 |
| KR | 2003-0052152 | 6/2003 |
| KR | 2003-0084071 | 11/2003 |
| KR | 10-2004-0083561 | 10/2004 |
| KR | 10-2006-0011728 | 2/2006 |
| KR | 10-2007-0005362 | 1/2007 |
| KR | 10-2007-0010953 | 1/2007 |
| KR | 10-0663866 | 1/2007 |
| KR | 10-0683818 | 2/2007 |
| KR | 10-2007-0033165 | 3/2007 |
| KR | 10-2007-0035830 | 4/2007 |
| KR | 10-0886169 | 2/2009 |
| KR | 10-2012-0007896 | 1/2012 |
| KR | 10-2012-0010592 | 2/2012 |
| KR | 10-2013-0021680 | 3/2013 |
| KR | 10-2013-0141975 | 12/2013 |
| KR | 10-2015-0022127 | 3/2015 |
| WO | 2007/060188 | 5/2007 |

OTHER PUBLICATIONS

Written Opinion of the International Searching Authority dated Nov. 24, 2016 in corresponding International Patent Application No. PCT/KR2016/009096.
U.S. Office Action dated Nov. 9, 2017 in U.S. Appl. No. 15/700,856.
U.S. Notice of Allowance dated Dec. 26, 2017 in U.S. Appl. No. 15/700,856.
U.S. Appl. No. 15/700,856, filed Sep. 11, 2017, Keon Pyo Koo, et al., Samsung Electronics Co., Ltd.
Extended European Search Report dated Aug. 6, 2018 in European Patent Application No. 16842160.0.

* cited by examiner

REFRIGERATOR

CROSS-REFERENCE TO RELATED APPLICATIONS

This application is a continuation of U.S. patent application Ser. No. 15/700,856 filed Sep. 11, 2017, which is a continuation application under 35 U.S.C. § 111(a) of PCT International Patent Application No. PCT/KR2016/009096, filed Aug. 18, 2016 which claims the foreign priority benefit under 35 U.S.C. § 119 to Korean Patent Application Nos. 10-2015-0123373 and 10-2015-0187980 filed Sep. 1, 2015 and Dec. 28, 2015, respectively, the contents of which are incorporated herein by reference.

TECHNICAL FIELD

The present disclosure relates to refrigerators, and more particularly, to a refrigerator having an improved structure with a display unit.

BACKGROUND ART

Refrigerators are home appliances having a storeroom for storing groceries and a cool-air supply for supplying cool air into the storeroom, thereby keeping the groceries fresh.

The storeroom is formed to have an open front to be able to take in and out groceries therefrom, and the open front can be opened/shut by a door.

With the recent trend of advancement of home appliances, refrigerators with a built-in display having input/output functions are being developed and released. The display may be placed on the front of the door for user convenience.

Studies and development on assembling structures of the display are actively going on to effectively fix the display on the door of the refrigerator and at the same time improve the overall design of the refrigerator with the display.

DISCLOSURE

Technical Problem

The present disclosure provides a refrigerator having an improved structure to simplify the assembling structure of a door with a display unit.

The present disclosure also provides a refrigerator having an improved structure to realize a sophisticated design through coordination between a door and a display unit built into the door.

The present disclosure also provides a refrigerator having an improved structure with various convenient functions.

Technical Solution

In accordance with one aspect of the present disclosure, a refrigerator comprises a main body, a storeroom arranged inside the main body with an open front, a door pivotally connected to the main body for opening or closing the open front of the storeroom and a display unit installed on the door. The display unit comprises a display for displaying images, a display glass located on the front of the display to have an area larger than the display and form a touch screen, a display case with a display mounter for the display to be mounted therein, a display unit case fixedly connected to the door and a fixing unit for fixedly connecting the display case to the display unit case by pressing a part of the display case.

In accordance with one aspect of the present disclosure, the refrigerator further comprises a pressing piece formed on the back of the display case facing the display unit case to extend from the back of the display case. The pressing piece is fixedly connected into a fixing groove formed inside the display unit case by being pressed by the fixing unit.

The fixing unit comprises a fixed body fixed on the back of the display case facing the display unit case and a pressing member for pressing a pressing piece formed to extend from the back of the display case, toward the outside of the refrigerator, by passing through the fixed body.

The display unit case comprises a base and a plurality of side walls formed along the circumference of the base to protrude forward of the refrigerator. The plurality of side walls comprise an inner wall, on which a fixing groove is formed to be fixedly connected to the pressing piece and an outer wall formed to enclose the inner wall from outside of the inner wall.

The door comprises a door frame. The door frame comprises a display unit mounter in which the display unit is mounted, an insert frame extending from an edge of the display unit mounter toward the back of the refrigerator and a plurality of combiners formed in the insert frame.

The display unit case comprises a base and a plurality of side walls formed along the circumference of the base to protrude forward of the refrigerator, The plurality of side walls comprise an inner wall and an outer wall separately arranged outside of the inner wall to have an insert space, to which the insert frame is inserted, formed between the inner wall and the outer wall. A plurality of latches are formed on at least one of the inner side of the outer wall facing the inner wall and the outer side of the inner wall facing the outer wall to be connected to the plurality of combiners.

A plurality of guide projections are formed on at least one of the inner side of the outer wall facing the inner wall and the outer side of the inner wall facing the outer wall to guide insertion of the insert frame to the insert space.

The door further comprises a door panel having a face facing the storeroom and connected to the door frame. The door frame, the display unit case mounted in the display unit mounter, and the door panel form an insulation space filled with an insulation material.

The door frame further includes a handle mounter in which a handle is mounted. The handle mounter comprises an opening, to which a part of the handle is inserted and combining frames fixedly connected to the handle and arranged separately from each other with the opening between the combining frames.

The combining frame comprises a first combining frame fixedly connected to a part of the handle in the front-and-back direction of the refrigerator and a second combining frame fixedly connected to another part of the handle in the left-and-right direction of the refrigerator.

The display glass comprises a first area corresponding to the display and a second area other than the first area. The refrigerator further comprises a communication module arranged behind the second area to face the second area for transmitting and receiving electromagnetic waves.

In accordance with one aspect of the present disclosure, the refrigerator further comprises a proximity detection sensor installed in the bottom part of the display case to activate the display when determining that a user is approaching by detecting whether the user is approaching.

The door comprises a door frame having a display unit mounter in which the display unit is mounted. The display glass is attached onto the display case to form the front exterior of the door together with the door frame.

The display glass is attached onto the display case to be separated by a certain distance toward the inside of the door from an edge of the display unit mounter.

Advantageous Effects

According to embodiments of the present disclosure, a display case and a display unit case may be easily assembled by using a pressing member of a fixing unit to push a pressing piece extending from the display case into a fixing groove formed on a side wall of the display unit case.

The door, the display unit case, and the display case may be easily assembled in the up-and-down direction of the door by using the fixing member that passes through a boss formed in a plurality of door caps.

At least one of a communication module and an proximity detection sensor may be arranged behind a display glass having a larger area than the display, thereby preventing a metal door frame from interfering with transmission and reception of electromagnetic waves.

With the display glass located in front of the display and attached onto the display case to be separated by a certain distance from the edge of a display unit mounter toward the inside of the door, an extra trim structure for fixing the display may be omitted, which results in realization of a sophisticated exterior of the refrigerator.

BEST MODE

Figure 1:
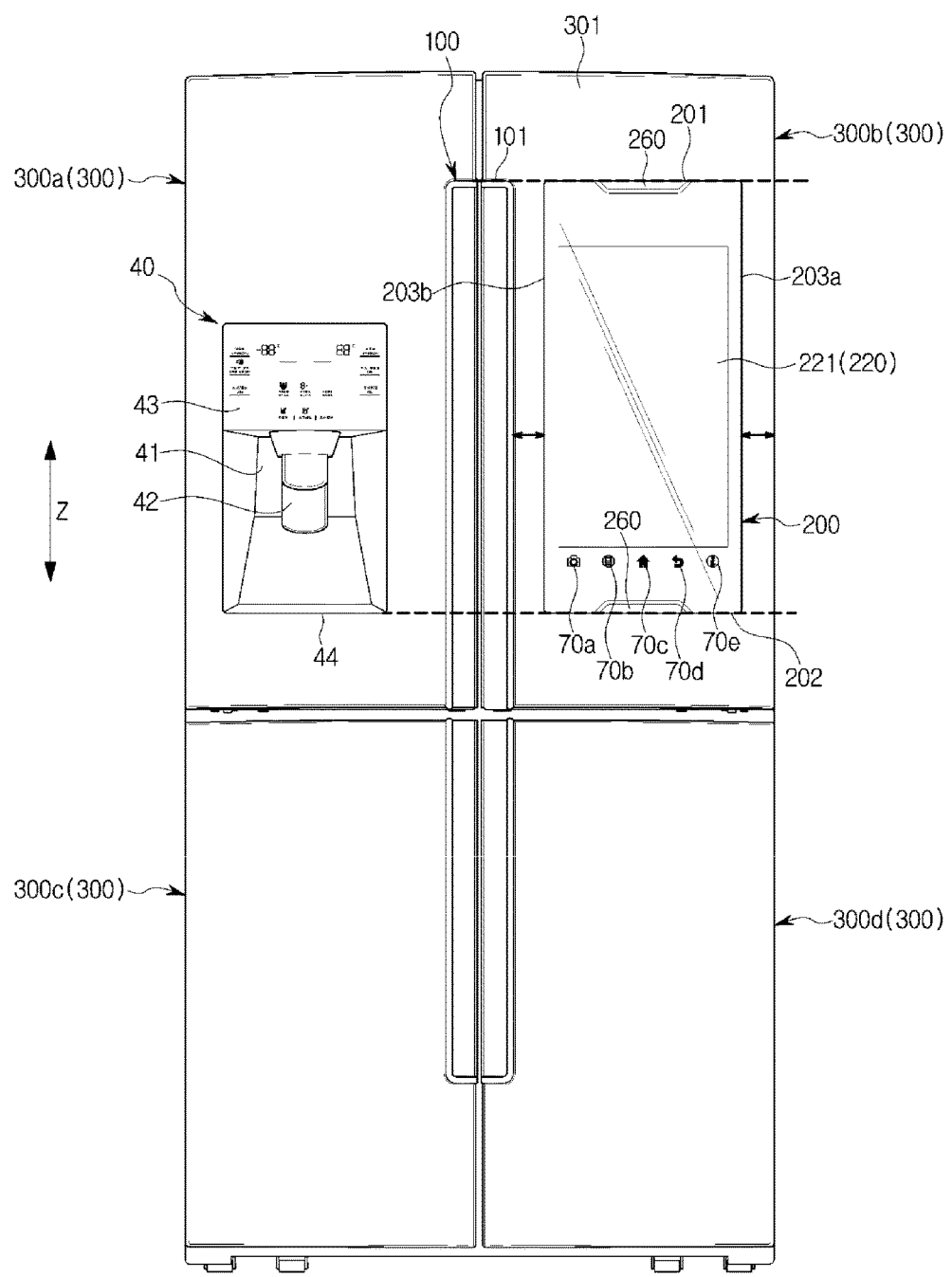
FIG. 1 is a front view of a refrigerator with a deactivated display, according to an embodiment of the present disclosure.

Reference will now be made in detail to embodiments, examples of which are illustrated in the accompanying drawings, wherein like reference numerals refer to the like elements throughout. The terms "front", "rear", "upper", "lower", "top", and "bottom" as herein used are defined with respect to the drawings, but the terms may not restrict the shape and position of the respective components.

Directivity of a door 300, 1000 will be described based on a case where the door 300, 1000 shuts a storeroom 20. Accordingly, the up-and-down direction of the door 300, 1000 may refer to the same direction as the up-and-down direction of a refrigerator 1. The left-and-right direction of the door 300, 1000 may also refer to the same direction as the left-and-right direction of the refrigerator 1. The front-and-back direction of the door 300, 1000 may also refer to the same direction as the front-and-back direction of the refrigerator 1.

Figure 2:
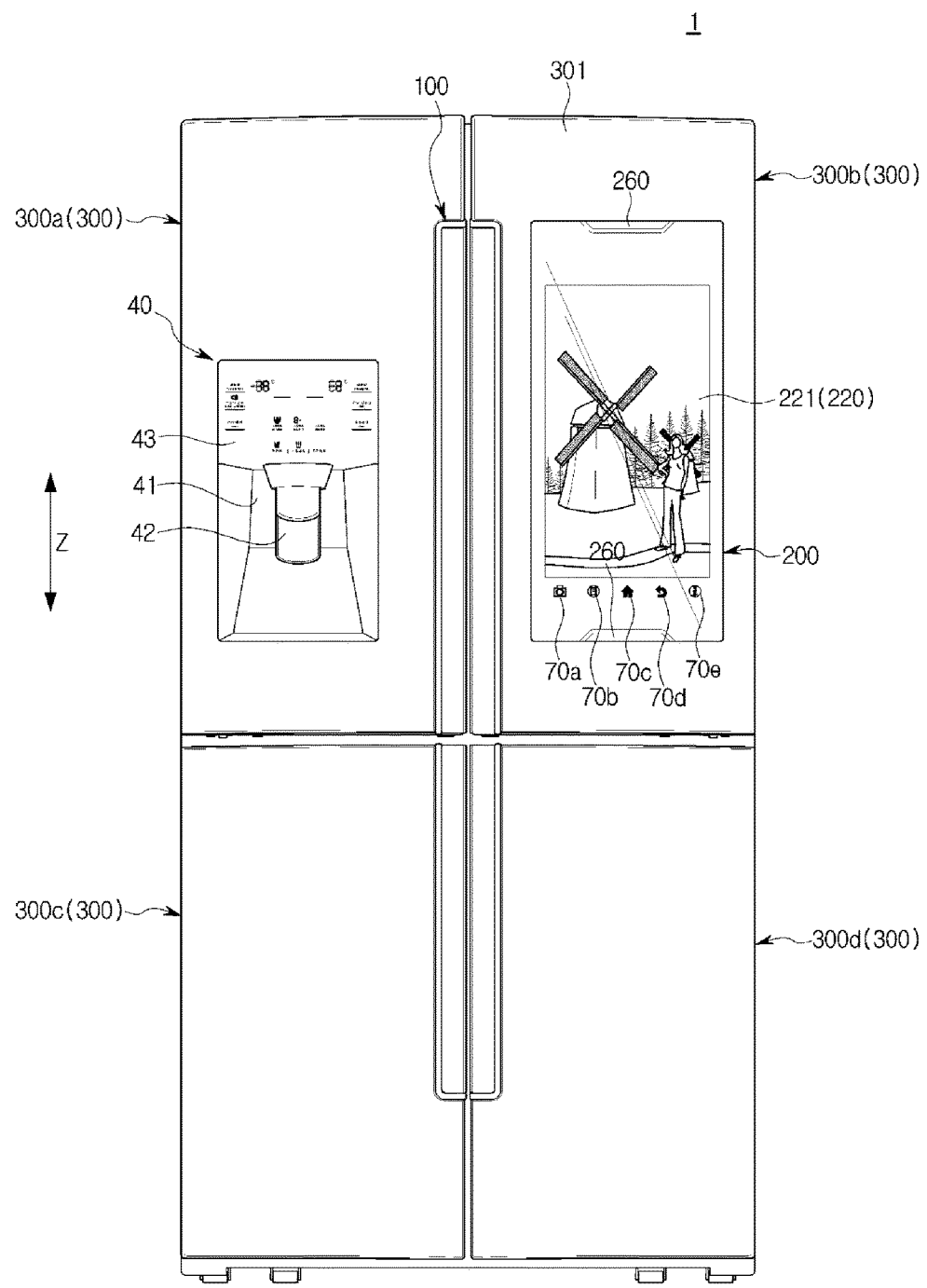
FIG. 2 is a front view of a refrigerator with an activated display, according to an embodiment of the present disclosure.
Figure 3:
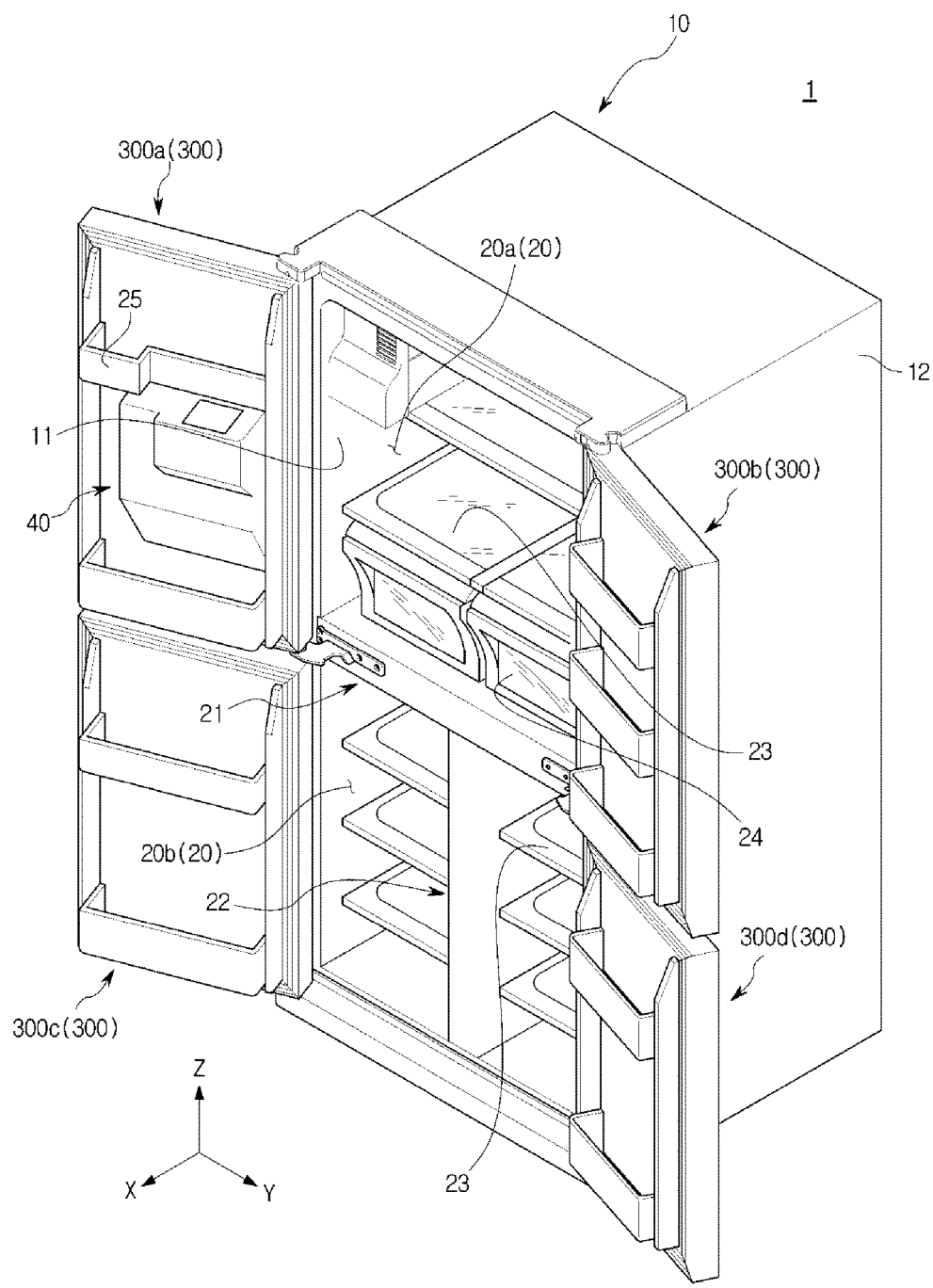
FIG. 3 is a perspective view of a refrigerator with the doors open, according to an embodiment of the present disclosure.

FIG. 1 is a front view of a refrigerator with a deactivated display, according to an embodiment of the present disclosure, and FIG. 2 is a front view of a refrigerator with an activated display, according to an embodiment of the present disclosure. FIG. 3 is a perspective view of a refrigerator with the doors open, according to an embodiment of the present disclosure.

As shown in FIGS. 1 to 3, the refrigerator 1 may include a main body 10, a storeroom 20 with the front open, which is formed inside the main body 10, and a door 300 pivotally connected to the main body 10 to open/shut the open front of the storeroom 20.

The main body 10 may form the exterior of the refrigerator 1. The main body 10 may include an inner case 11 that forms the storeroom 20, and an outer case 12 connected to the outer side of the inner case 11 to form the exterior. The main body 10 may further include a cool air supply (not shown) for supplying cool air into the storeroom 20.

The cool air supply may be comprised of a compressor, a condenser, an expansion valve, an evaporator, a blower fan, a freezer duct, and the like. Insulation (not shown) may be packed between the inner case 11 and the outer case 12 of the main body 10 to prevent leakage of the cool air from the storeroom 20.

There may be a machine room (not shown) in a rear bottom part of the main body 10, where the compressor for compressing refrigerant and the condenser for condensing the compressed refrigerant are installed.

The storeroom 20 may be partitioned by horizontal and vertical partition walls 21 and 22 into a plurality of rooms. In the embodiment, the storeroom 20 may include an upper storeroom 20a and a lower storeroom 20b. Shelves 23 on which groceries are put, and closed containers 24 for airtightly containing groceries may be arranged in the storeroom 20. The storeroom 20 may be formed to have the front open to take in/out groceries therefrom, and the open front may be opened/shut by the door 300.

The upper storeroom 20a may be opened/shut by a plurality of doors 300a, 300b. The lower storeroom 20b may be opened/shut by a plurality of doors 300c, 300d.

The refrigerator 1 may further include a handle 100 formed in the door 300. The user may easily open/shut the door 300 while holding the handle 100. The handle 100 may be formed to be elongated along the up-and-down direction Z of the door 300. A structure of the handle 100 will be described in detail later.

The refrigerator 1 may further include a dispenser 40. The dispenser 40 may be built in the door 300. For example, the dispenser 40 may be built in the top left door 300a. In the following description, assume that the dispenser 40 is built in the top left door 300a. The user may take water or ice out directly through the dispenser 40 without opening the door 300a. The dispenser 40 may include a cavity 41 sunken inwardly from the door 300a to form a take-out space. In the cavity 41, there may be a take-out hole (not shown) through which water or ice comes out, and a take-out lever 42 to take the water or ice out. When the take-out lever 42 is pressed, water or ice comes out from the take-out hole. The dispenser 40 may further include a dispenser state display window 43 for displaying a state of operation of the dispenser 40. The dispenser state display window 43 may have a touch function.

The refrigerator 1 may further include a display unit 200. The display unit 200 may be built in the door 300 for the user convenience. Specifically, the display unit 200 may be installed on the front side 301 of the door 300. Although FIGS. 1 and 2 show the display unit 200 installed on a top right door 300b, the display unit 200 may be installed at any place on any door 300 without being limited to the top right door 300b. In the following description, assume that the display unit 200 is built in the top right door 300b.

A top end 201 of the display unit 200 may be aligned with a top end 101 of the handle 100 in the up-and-down direction Z of the door 300. A bottom end 202 of the display unit 200 may be aligned with a bottom end 44 of the dispenser 40 in the up-and-down direction Z of the door 300. One side end 203b of the display unit 200 adjacent to the handle 100 may be separated by a certain distance from the handle 100. The other side end 203a opposite of the one side end 203b of the display unit 200 adjacent to the handle 100 may be separated by a certain distance from the edge of the door 300.

To put it from a different perspective, the display unit 200 may have a rectangular form with elongated sides in the up-and-down direction Z of the door 300. The display unit 200 may include a right long side 203a directed toward the right of the door 300, a left long side 203b directed toward the left of the door 300, a top short side 201 directed toward the top of the door 300, and a bottom short side 202 directed toward the bottom of the door 300. The right long side 203a may be separated by a certain distance from the right edge of the door 300 in the left direction of the door 300. The left long side 203b may be separated by a certain distance from the handle 100 in the right direction of the door 100. The top short side 201 may be aligned with the top end 101 of the handle 100 in the up-and-down direction Z of the door 300. The bottom short side 202 may be aligned with the bottom end 44 of the dispenser 40 in the up-and-down direction Z of the door 300.

This arrangement of the display unit 200 may realize a sharp and stable design of the refrigerator 1. In describing such arrangement relations among the display unit 200, the dispenser 40, and the handle 100, the display unit 200 may be used in the same sense as the display glass 220.

The display unit 200 may have a wakeup function automatically activated when the user approaches to within a certain range. The wakeup function may be implemented by a proximity detection sensor 50 (see FIG. 5). Specifically, as shown in FIG. 2, when the proximity detection sensor 50 detects a user approaching to within a certain range, the display unit 200 is activated. In other words, the display unit 200 is in the ON state. On the other hand, as shown in FIG. 1, when no approach of the user is detected within the certain range by the proximity detection sensor 50, the display unit 200 is not activated. In other words, the display unit 200 is in the OFF state. Once the display unit 200 is activated, various videos or images may be displayed on a display 210.

The display unit 200 will be described in more detail later.

Figure 4:
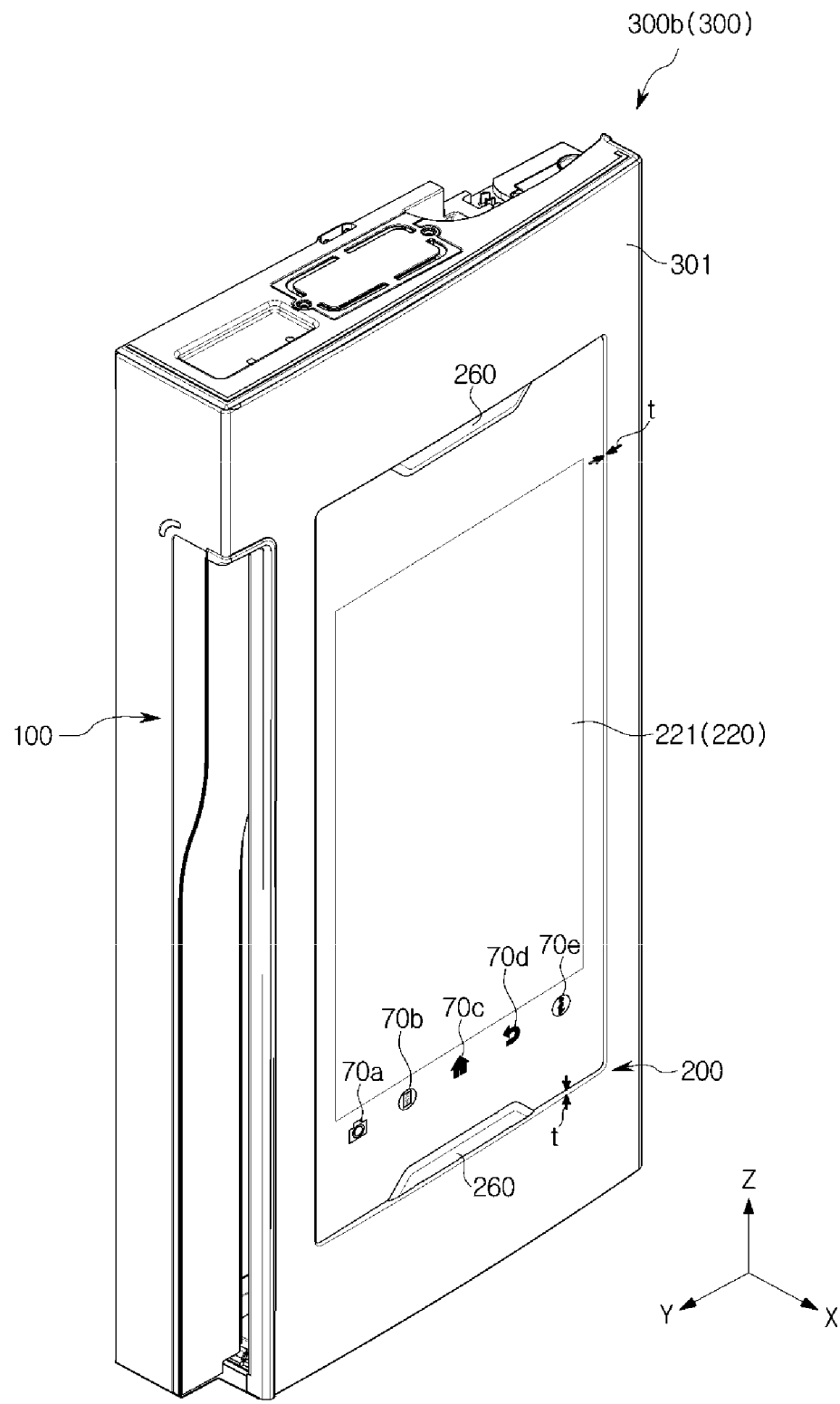
FIG. 4 is a perspective view of a door of a refrigerator with a display built in the door, according to an embodiment of the present disclosure.
Figure 5:
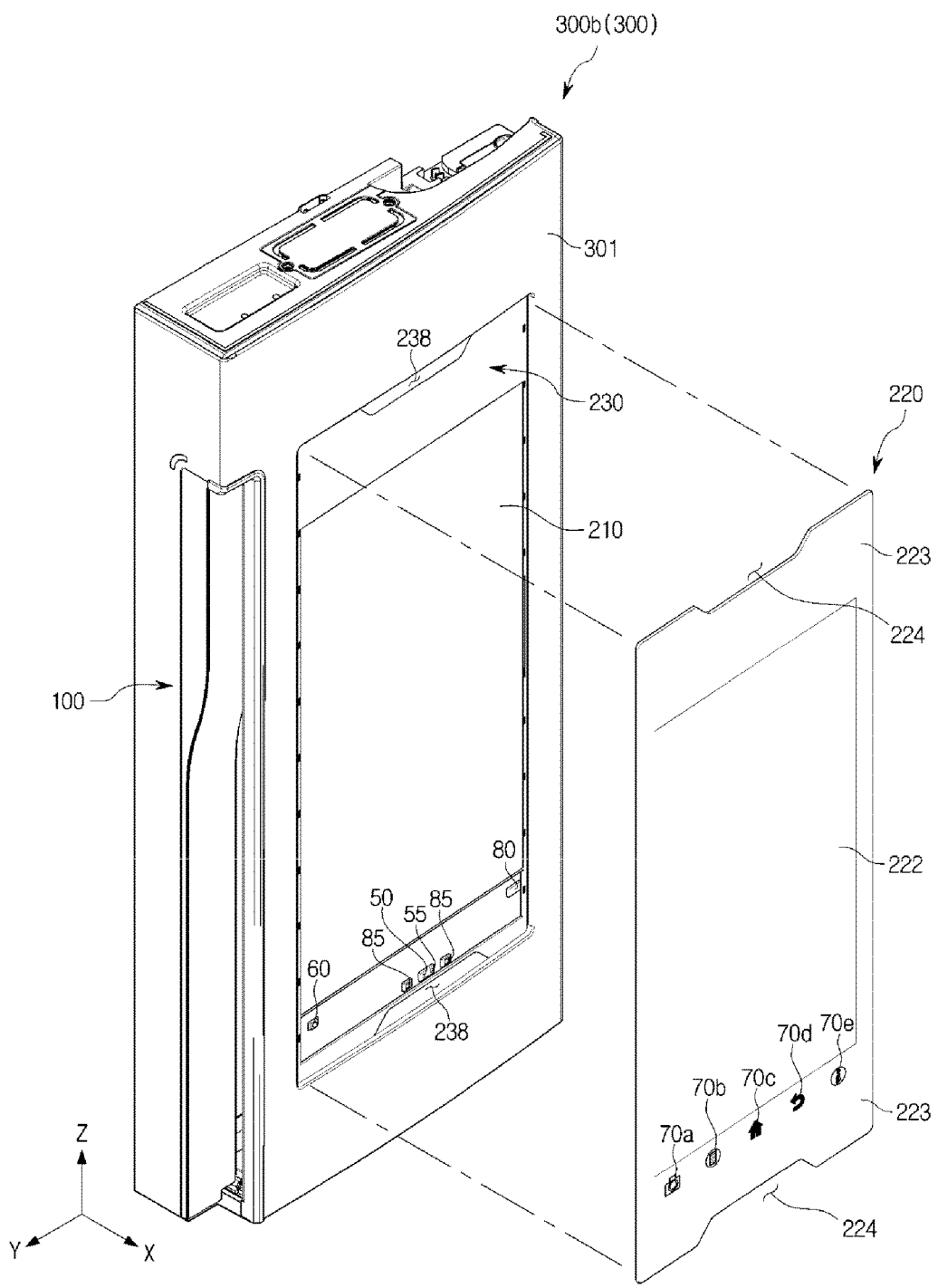
FIG. 5 is a perspective view of a door of a refrigerator with a display glass removed therefrom to show a first example of the arrangement of embedded structures, according to an embodiment of the present disclosure.

FIG. 4 is a perspective view of a door of a refrigerator with a display built in the door, according to an embodiment of the present disclosure, and FIG. 5 is a perspective view of a door of a refrigerator with a display glass removed therefrom to show a first example of the arrangement of embedded structures, according to an embodiment of the present disclosure. In the following description, a door refers to a door with the display unit 200 built therein, i.e., the top right door 300b. In FIG. 5, a combining cover 260 is omitted.

As shown in FIGS. 4 and 5, the display unit 200 may include the display 210 for displaying images or videos. The display 210 may further include a Liquid Crystal Display (LCD).

The display unit 200 may further include the display glass 220.

The display glass 220 may be located on the front of the display 210. A touch screen 221 may be formed on the display glass 220.

How to form the touch screen 221 on the display glass 220 is as follows:

A deposited film is attached on the rear side of the display glass 220 that faces the display 210. After that, the rear side of the display glass 220 is printed in order to prevent internal components of the display unit 200 from being exposed through the display glass 220. Specifically, to shield the internal components and assembling structures of the display unit 200, edges of the rear side of the display glass are printed. A first area 222, as will be described later, may not be printed for the user to see an image or video displayed on the display 210. On the other hand, a second area 223 may be printed for shielding. After the printing process, a touch film is attached on the rear side of the display glass 220.

Another way of forming the touch screen 221 on the display glass 220 is as follows:

A polaroid film is attached on the rear side of the display glass 220 that faces the display 210. After that, edges of the rear side of the display glass 220 are printed in order to prevent the internal components or assembling structures of the display unit 200 from being exposed through the display glass 220. As described above, the first area 222 may not be printed while the second area 223 may be printed. After the printing process, a touch film is attached on the rear side of the display glass 220.

The touch screen 221 may be implemented to have an electrostatic type or a resistive type.

The way of forming the touch screen 221 is, however, not limited to the example.

The display glass 220 may have an area larger than the display 210. As such, using the display glass 220 having an area larger than the display 210 may secure a room for placing extra components without encroaching on the display 210.

To put this from a different perspective, the display glass 220 may include the first area 222 and the second area 223.

The first area 222 may be an area corresponding to the display 210.

The second area 223 may be an area other than the first area 222. Since the second area 223 is shielded through the printing process, various components may be arranged behind the second area 223. The arrangement relations among the various components will be described in more detail later.

At least one input icon may be placed on the display glass 220. The at least one input icon may include, for example, a camera icon 70a to run a camera 60, a list icon 70b to arrange various lists related to functions of the refrigerator 1, a home icon 70c to go back to a start screen, a back icon 70d to go back to the previous stage, and an information icon 70e to provide information about overall functions of the refrigerator 1 or the display unit 200.

The at least one input icon may be formed on the display glass 220. Preferably, the at least one input icon may be formed in the second area 223 below the first area 222 so as to not interfere with the image or video displayed on the display 210.

The refrigerator 1 may further include the proximity detection sensor 50 for activating the display 210 when determining approaching of the user by detecting whether the user is approaching. If the user approaches to within a certain range, the proximity detection sensor 50 detects the approaching of the user and sends the detection signal to a microcomputer 90, which in turn activates the display 210.

The refrigerator 1 may further include a communication module 80. With the communication module 80, the refrigerator 1 may access the Internet. The refrigerator 1 with the communication module 80 may surf the Internet using the touch screen 221. Furthermore, the refrigerator 1 with the communication module 80 may receive a control command from outside over the Internet. Moreover, if at least one home appliance is connected over a network, the refrigerator with the communication module 80 may also serve as a home network server for performing centralized control over the at least one home appliance. In other words, the refrigerator 1 with the communication module 80 may allow the user to enter an Internet command or control command for the refrigerator 1 by manipulating the touch screen 221. The Internet command or the control command for the refrigerator 1 entered through the touch screen 221 is forwarded to the microcomputer 90, which in turn displays a web page connected over the Internet or a result of processing the control command on the display 210. The communication module 80 may include, for example, at least one of Wi-Fi, Bluetooth, Zigbee, and Z-wave.

The refrigerator 1 may further include a camera 60 capable of taking pictures of people or things. An image or video taken by the camera 60 is displayed on the display 210.

The refrigerator 1 may further include at least one microphone 85 to implement a voice recognition function. A voice command input through the at least one microphone 85 is sent to the microcomputer 90, which in turn controls the display 210 to display a result of the voice command.

The refrigerator 1 may further include an illumination sensor 55. The illumination sensor 55 may adjust lighting of the display 210 to be brighter under a bright condition and darker under a dark condition, thereby reducing power loss of the refrigerator 1. The detection result of the illuminating sensor 55 is sent to the microcomputer 90, and the microcomputer 90 controls the display 210 to adjust the lighting of the display 210.

At least one of the proximity detection sensor 50, the communication module 80, the camera 60, at least one of the microphone 85 and the illumination sensor 55 may be arranged behind the display glass 220. Specifically, at least one of the proximity detection sensor 50, the communication module 80, the camera 60, at least one of the microphone 85 and the illumination sensor 55 may be arranged behind the second area 223 of the display glass 220 to face the second area 223 of the display glass 220. Especially, it is desirable for the communication module 80 for transmitting and receiving electromagnetic waves to be arranged behind the second area 223 of the display glass 220. This is because the communication module 80 may have difficulty in transmitting and receiving electromagnetic waves when arranged behind the metal door frame 310, because the metal door frame 310 may block the electromagnetic waves.

At least one of the proximity detection sensor 50, the communication module 80, the camera 60, at least one of the microphone 85 and the illumination sensor 55 may be arranged on the front of the display case 230 that faces the display glass 220.

In the following description, assume that all of the proximity detection sensor 50, the communication module 80, the camera 60, at least one of the microphone 85 and the illumination sensor 55 are arranged on the front of the display case 230 to be located behind the second area 223 of the display glass 220.

As shown in FIG. 5, the proximity detection sensor 50, the communication module 80, the camera 60, at least one of the microphone 85 and the illumination sensor 55 may be arranged on the front of the display case 230 to be located below the display 210. The camera 60 may be arranged on the left of the display case 230 to be adjacent to the display 210. The communication module 80 may be arranged on the right of the display case 230 to be adjacent to the display 210. The proximity detection sensor 50 and the illumination sensor 55 may be arranged among at least one microphone 85. The at least one microphone 85 refers to a plurality of microphones. The proximity detection sensor 50, the illumination sensor 55, and the at least one microphone 85 may be arranged in the bottom part of the display case 230. Especially, the proximity detection sensor 50 may be arranged on the front bottom part of the display case 230 to be located under the display 210. The reason why it is desirable to arrange the proximity detection sensor 50 in the front bottom part of the display case 230 is to even detect whether a user having small height like a child is approaching.

At least one of the proximity detection sensor 50, the communication module 80, the camera 60, at least one of the microphone 85 and the illumination sensor 55 may be arranged under at least one input icon. Specifically, the at least one input icon may be formed in the second area 223 to be located between the first area 222 and at least one of the proximity detection sensor 50, the communication module 80, the camera 60, at least one of the microphone 85 and the illumination sensor 55 in the up-and-down direction Z of the door 300. The arrangement of the at least one input icon is not, however, limited to the example, but may be modified in various ways.

Figure 6:
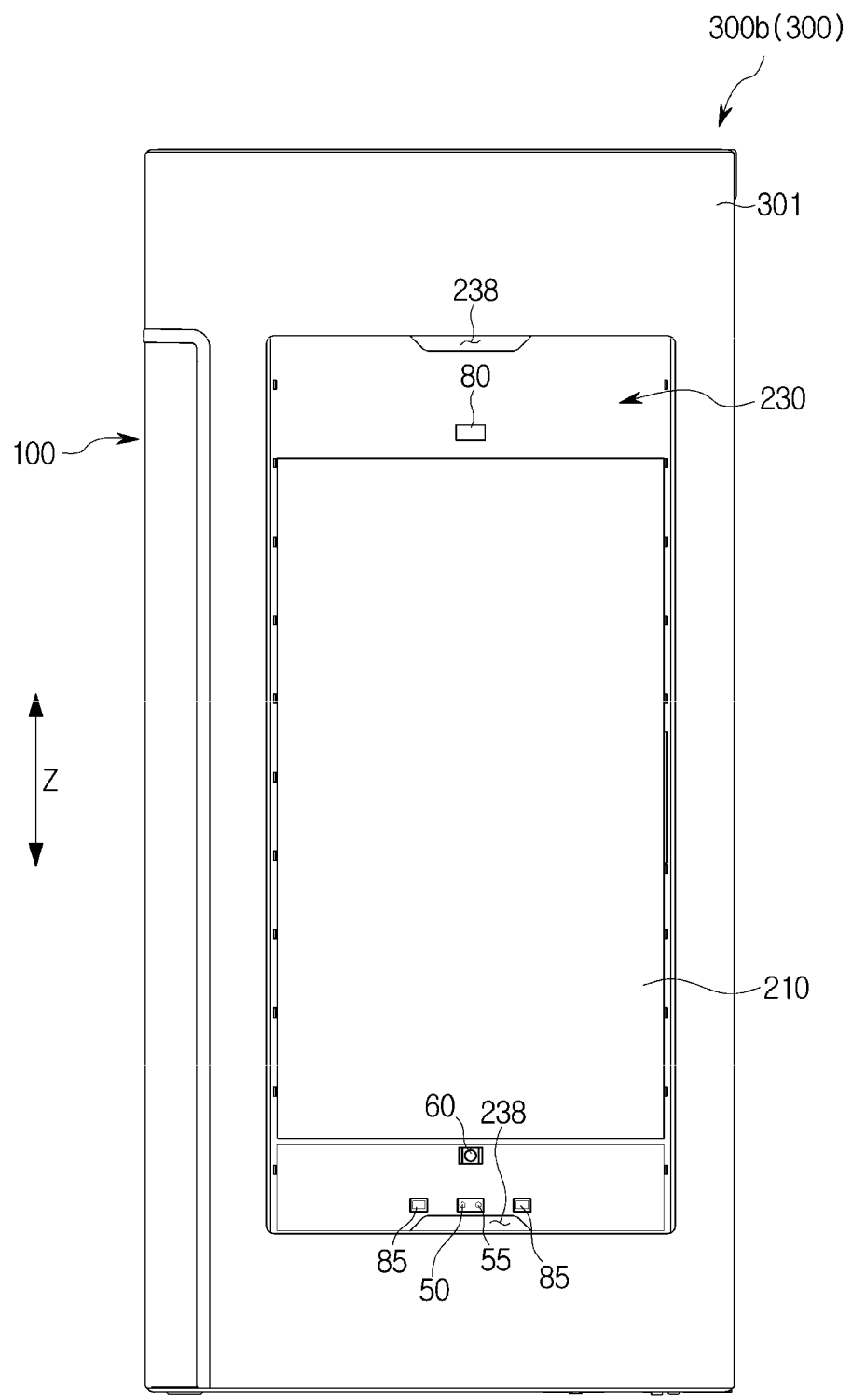
FIG. 6 is a front view of a door of a refrigerator with a display glass omitted to show a second example of the arrangement of embedded structures, according to an embodiment of the present disclosure.

FIG. 6 is a front view of a door of a refrigerator with a display glass omitted to show a second example of the arrangement of embedded structures, according to an embodiment of the present disclosure. What are overlapped with FIGS. 4 and 5 will be omitted in the following description.

As shown in FIG. 6, the proximity detection sensor 50, the camera 60, at least one of the microphone 85 and the illumination sensor 55 may be arranged on the front of the display case 230 to be located under the display 210. The camera 60 may be arranged in the middle of the display case 230 to be adjacent to the display 210. The proximity detection sensor 50 and the illumination sensor 55 may be arranged among at least one microphone 85. The at least one microphone 85 refers to a plurality of microphones. The proximity detection sensor 50, the illumination sensor 55, and the at least one microphone 85 may be arranged in the bottom part of the display case 230.

The communication module 80 may be arranged on the front of the display case 230 to be located above the display 210.

The arrangement of the proximity detection sensor 50, the communication module 80, the camera 60, at least one of the microphone 85 and the illumination sensor 55 is not limited to the example, but may be modified in various ways.

Figure 7:
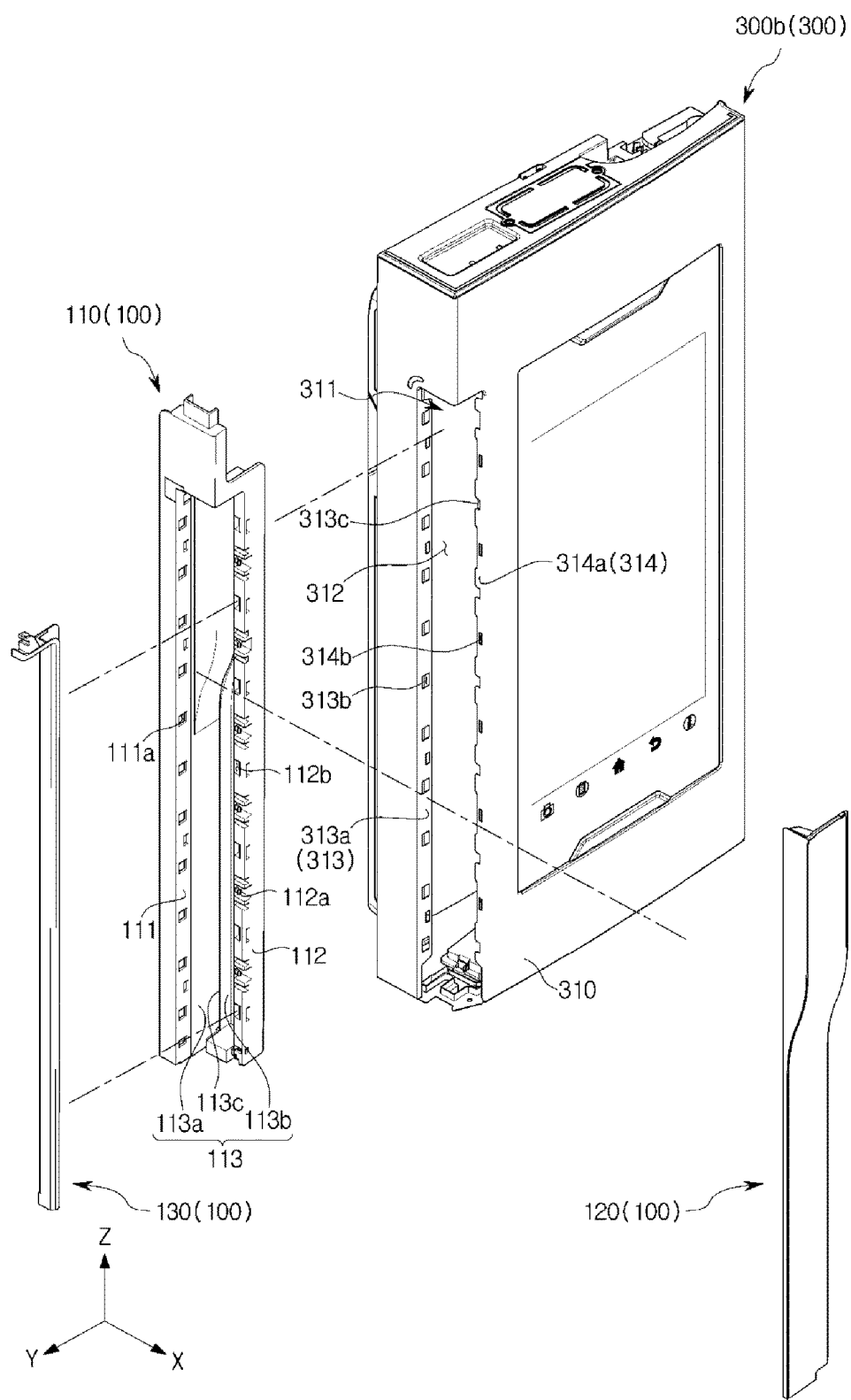
FIG. 7 is an exploded view illustrating a handle of a refrigerator, according to an embodiment of the present disclosure.
Figure 8:
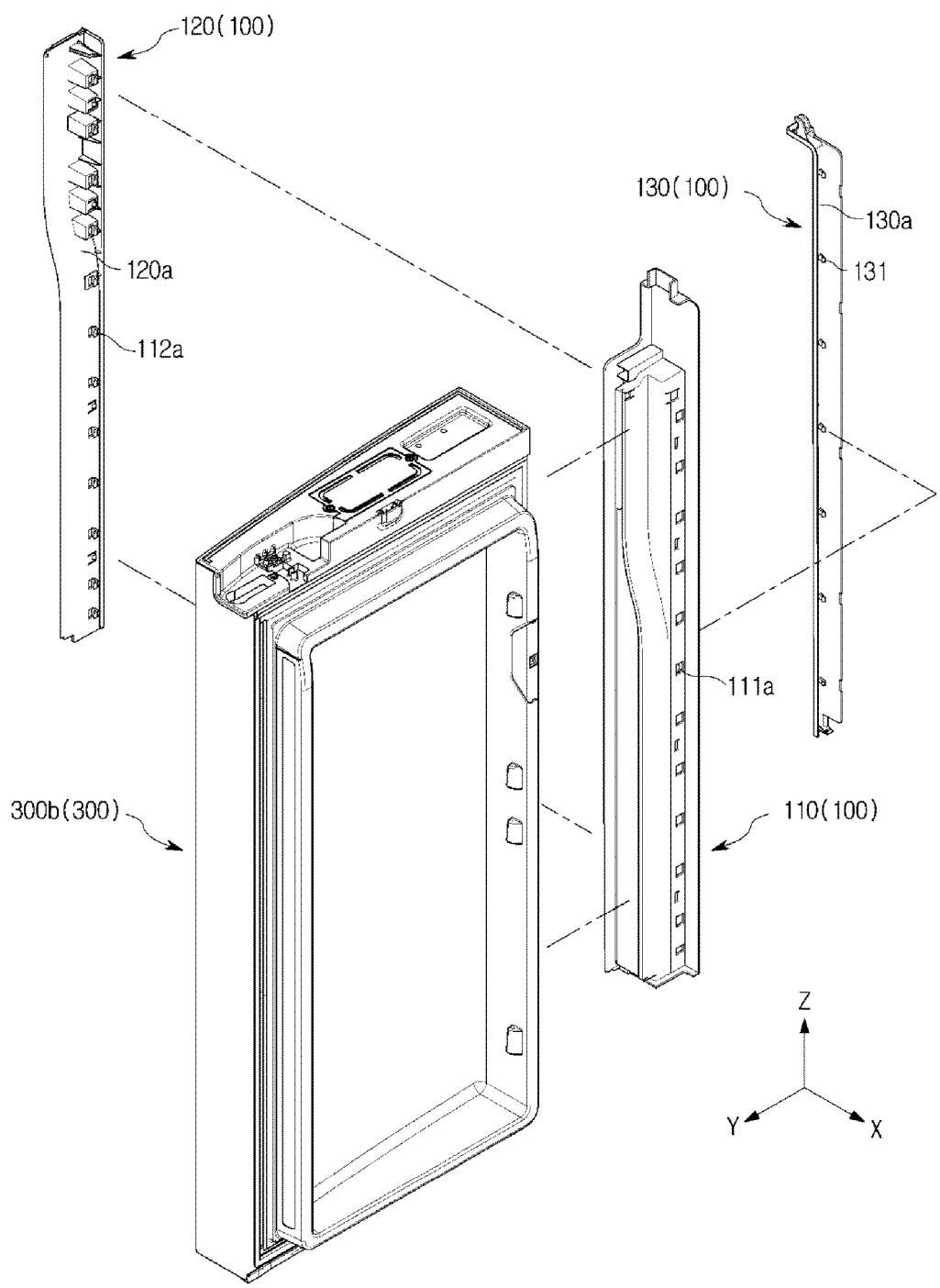
FIG. 8 is an exploded view illustrating a different angle of the handle of the refrigerator of FIG. 7, according to an embodiment of the present disclosure.

FIG. 7 is an exploded view illustrating a handle of a refrigerator, according to an embodiment of the present disclosure, and FIG. 8 is an exploded view illustrating a different angle of the handle of the refrigerator of FIG. 7, according to an embodiment of the present disclosure.

As shown in FIGS. 7 and 8, the handle 100 may be installed in the door 300. Specifically, the handle 100 may be fixedly connected to a handle mounter 311 formed in the door frame 310.

The handle mounter 311 may include an opening 312, into which part of the handle 100 is inserted, and combining frames 313, 314, with which the handle 100 is fixedly connected.

The combining frames 313, 314 may be separately arranged with the opening 312 between them.

The combining frames 313, 314 may extend from the door frame 310.

The combining frames 313, 314 may include a first combining frame 313 and a second combining frame 314. Part of the handle 100 may be fixedly connected to the first combining frame 313 in the front-and-rear direction X of the refrigerator 1. The first combining frame 313 may extend from the door frame 310 toward the opening 312 such that it has a front side 313a directed forward of the door 300 and a rear side (not shown) directed backward of the door 300. The other part of the handle 100 may be fixedly connected to the second combining frame 314 in the left-and-right direction Y of the refrigerator 1. The second combining frame 314 may extend from the door frame 310 toward the opening 312 such that it has a lateral side 314a directed sideway of the door 300.

A plurality of combining holes 313b, 314b may be formed in the combining frames 313, 314. A plurality of first combining holes 313b may be formed in the first combining frame 313, and a plurality of second combining holes 314b may be formed in the second combining frame 314.

The handle 100 may include first, second, and third handle members 110, 120, and 130.

The first handle member 110 may be inserted to the opening 312.

The first handle member 110 may include a first fixing frame 111 located behind the first combining frame 313 in the front-and-rear direction X of the refrigerator 1 when inserted to the opening 312. A plurality of first fastening holes 111a corresponding to the plurality of first combining holes 313b formed in the first combining frame 313 may be formed in the first fixing frame 111.

The first handle member 110 may further include a second fixing frame 112 located to the right of the second combining frame 314 in the left-and-right direction Y of the refrigerator 1 when inserted to the opening 312. In other words, the first handle member 110 may further include a second fixing frame 112 located inside of the door 300 deeper than the second combining frame 314 when inserted to the opening 312. A plurality of fasteners 112a corresponding to the plurality of second combining holes 314b formed in the second combining frame 314 may be formed in the second fixing frame 112. The plurality of fasteners 112a may be connected into the plurality of second combining holes 314b. Specifically, the plurality of fasteners 112a may be hooked into the plurality of second combining holes 314b. The second fixing frame 112 of the first handle member 110 may be fixedly connected to the second combining frame 314 of the door frame 310 through combination of the plurality of fasteners 112a and the plurality of second combining holes 314b.

A plurality of second fastening holes 112b may be formed in the second fixing frame 112. The plurality of second fastening holes 112b may be formed alternately with the plurality of fasteners 112a in the up-and-down direction Z of the door 300. The plurality of second fastening holes 112b may be formed on the same face on which the plurality of fasteners 112a are formed, among a plurality of faces of the second fixing frame 112. Specifically, the plurality of second fastening holes 112b and the plurality of fasteners 112a may be formed on one face facing the left in the left-and-right direction Y of the refrigerator 1 among a plurality of faces of the second fixing frame 112.

The first handle member 110 may further include a connecting frame 113 for connecting the first and second fixing frames 111 and 112. The connecting frame 113 may have a bent shape. The connecting frame 113 may include a first connector 113a connected to the first fixing frame 111 and a second connector 113b connected to the second fixing frame 112. Since the first connector 113a is connected to the first fixing frame 111 in the left-and-right direction Y of the refrigerator 1 and the second connector 113b is connected to the second fixing frame 112 in the front-and-rear direction X of the refrigerator 1, the connecting frame 113 may have a bent part 113c at the joint between the first and second connectors 113a and 113b.

The second handle member 120 may be connected to the first handle member 110. Specifically, the second handle member 120 may be fixedly connected to the first fixing frame 111 of the first handle member 110.

The second handle member 120 may form the appearance of the handle 100 along with a third handle member 130 as will be described later.

The second handle member 120 may include the plurality of fixing fasteners 112a. The plurality of fixing fasteners 112a may be formed on one face 120a of the second handle member 120 opposite to the first combining frame 313. In other words, the plurality of fixing fasteners 112a may be formed on the one face 120a of the second handle member 120 directed backward in the front-and-rear direction X of the refrigerator 1.

The plurality of fixing fasteners 112a may be fixedly connected into the plurality of first fastening holes 111a formed on the first fixing frame 111 by passing through the plurality of first combining holes 313b formed on the first combining frame 313. The plurality of fixing fasteners 112a may pass through the plurality of first combining holes 313b and may be hooked into the plurality of first fastening holes 111a.

The third handle member 130 may be connected to the first handle member 110. Specifically, the third handle member 130 may be fixedly connected to the second fixing frame 112 of the first handle member 110.

The third handle member 130 may include a plurality of fixing combiners 131. The plurality of fixing combiners 131 may be formed on one face 130a of the third handle member 130 opposite to the second combining frame 314.

The plurality of fixing combiners 131 may be fixedly connected into the plurality of second fastening holes 112b formed on the second fixing frame 112 by passing through a plurality of via holes 313c formed on the first combining frame 313. The plurality of fixing combiners 131 may be hooked into the plurality of second fastening holes 112b by passing through the plurality of via holes 313c. The plurality of via holes 313c may be formed alternately with the plurality of second combining holes 314b in the up-and-down direction Z of the door 300. The plurality of via holes 313c may include an open edge.

An assembling process of the handle 100 will now be sequentially described.

Figure 9:
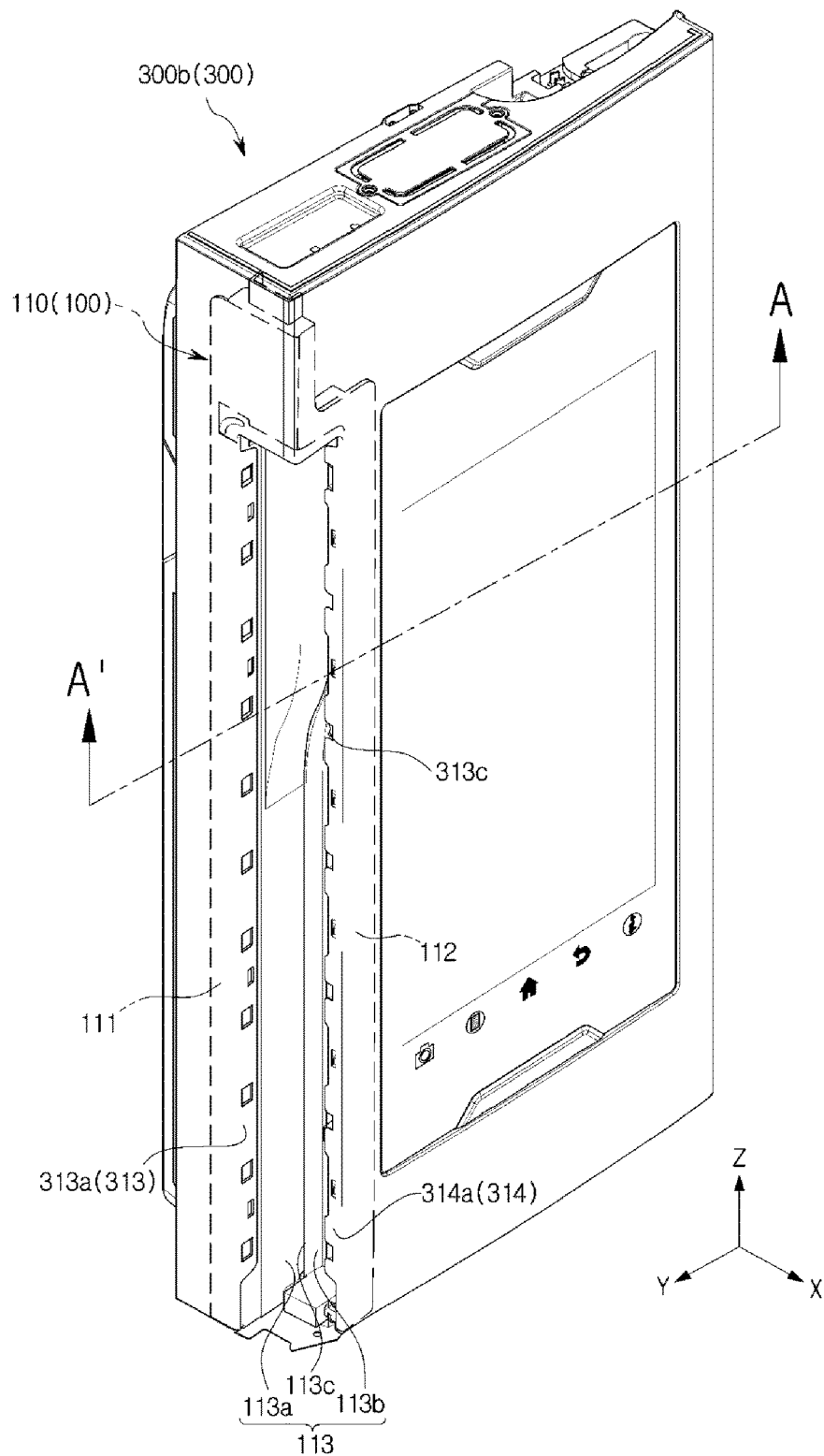
FIG. 9 is a perspective view of a door frame connected to a first handle member of a handle of a refrigerator, according to an embodiment of the present disclosure.
Figure 10:
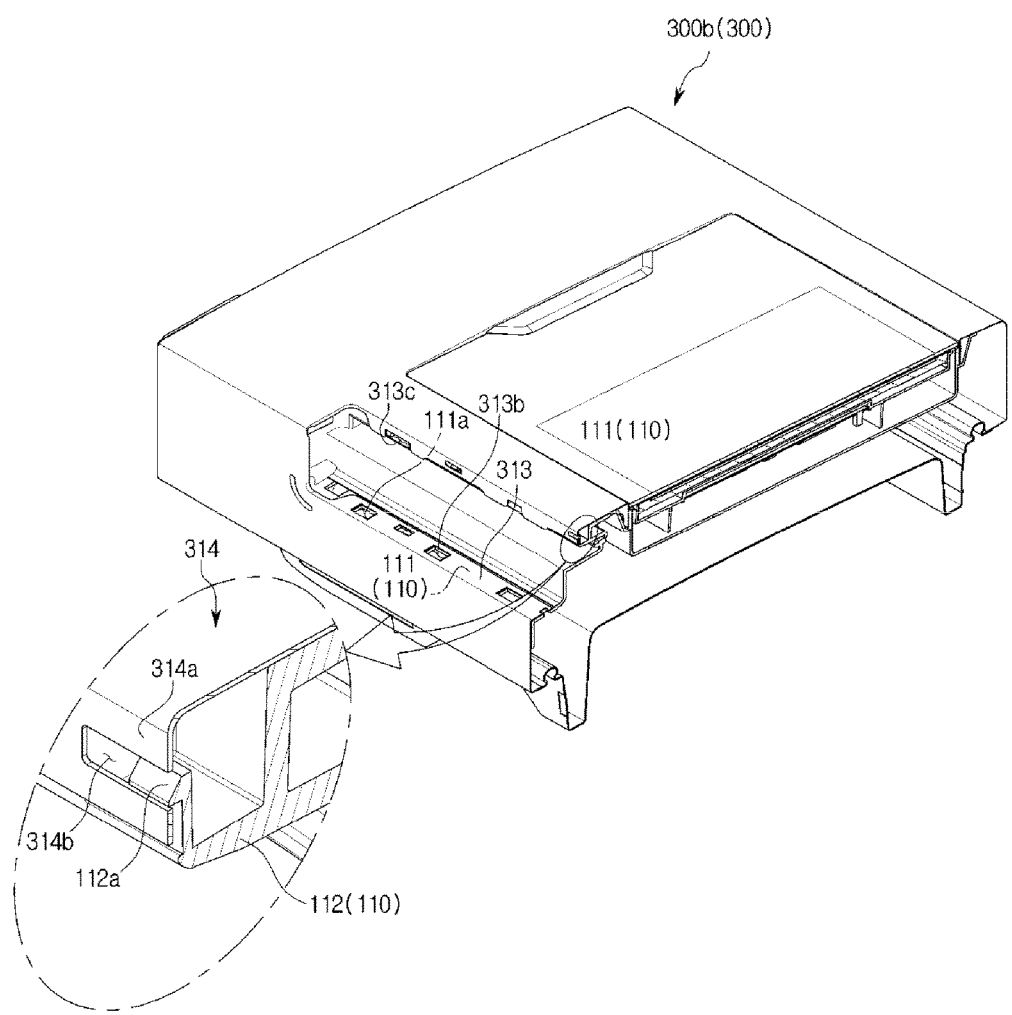
FIG. 10 is a view of the door of the refrigerator cut along A-A' of FIG. 9, according to an embodiment of the present disclosure.

FIG. 9 is a perspective view of a door frame connected to a first handle member of a handle of a refrigerator, according to an embodiment of the present disclosure, and FIG. 10 is a view of the door of the refrigerator cut along A-A' of FIG. 9, according to an embodiment of the present disclosure.

As shown in FIGS. 9 and 10, the first handle member 110 may be fixedly connected to the handle mounter 311 of the door frame 310.

The first handle member 110 may be mounted in the handle mounter 311 of the door frame 310 from behind of the door 300 to expose the connecting frame 113 of the first handle member 110 through the opening 312. In this regard, the first fixing frame 111 of the first handle member 110 is located behind the first combining frame 313 of the handle mounter 311 to match the first fastening holes 111a to the first combining holes 313b. Furthermore, the second fixing frame 112 of the first handle member 110 is located on the right to the second combining frame 314 of the handle mounter 311 to match the plurality of fasteners 112a to the second combining holes 314b.

The first handle member 110 is fixedly connected first with the door frame 310 through connection between the plurality of fasteners 112a and the second combining holes 314b.

Figure 11:
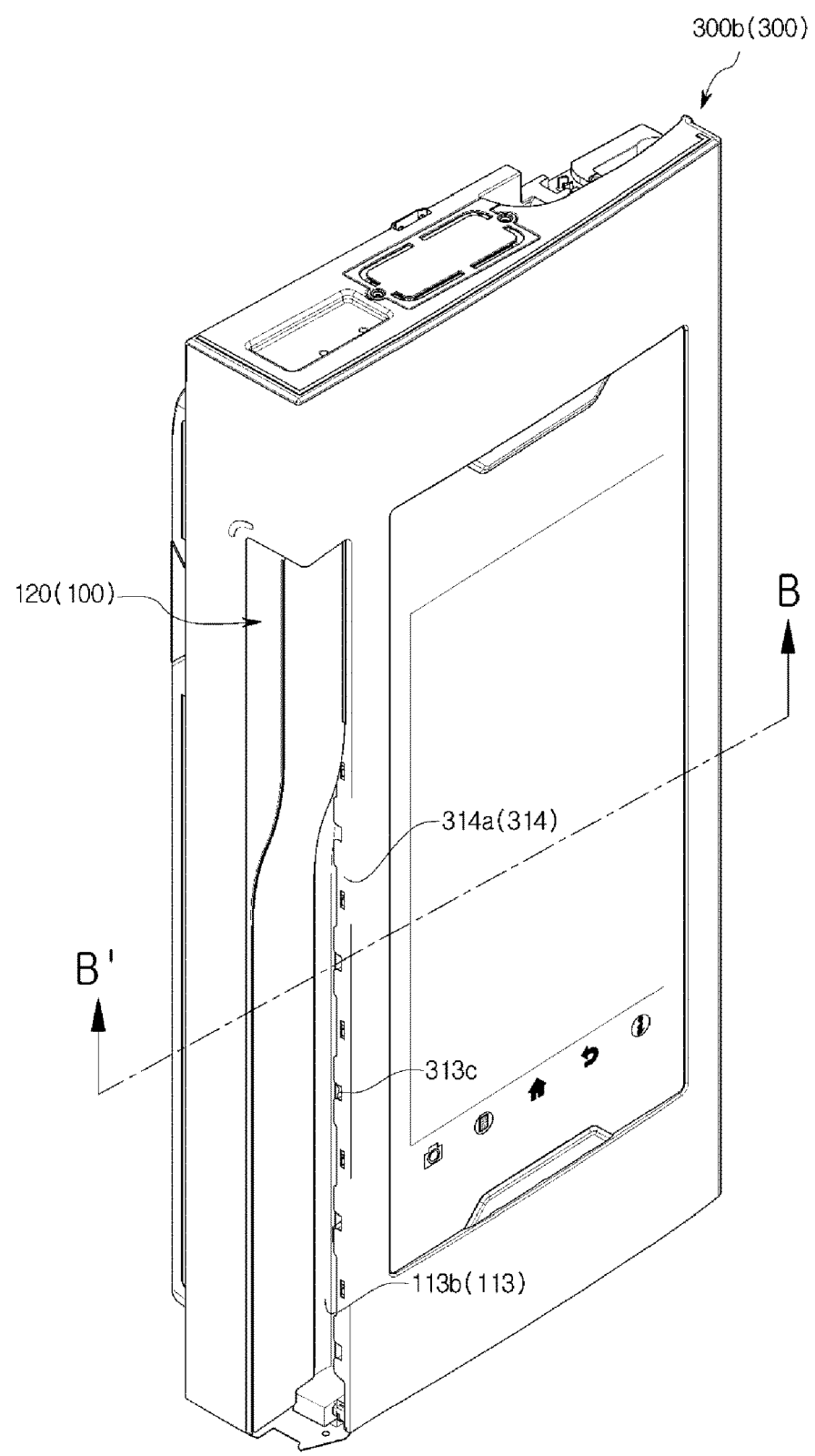
FIG. 11 is a perspective view of a second handle member of a handle connected to a door frame and a first handle member of the handle, according to an embodiment of the present disclosure.
Figure 12:
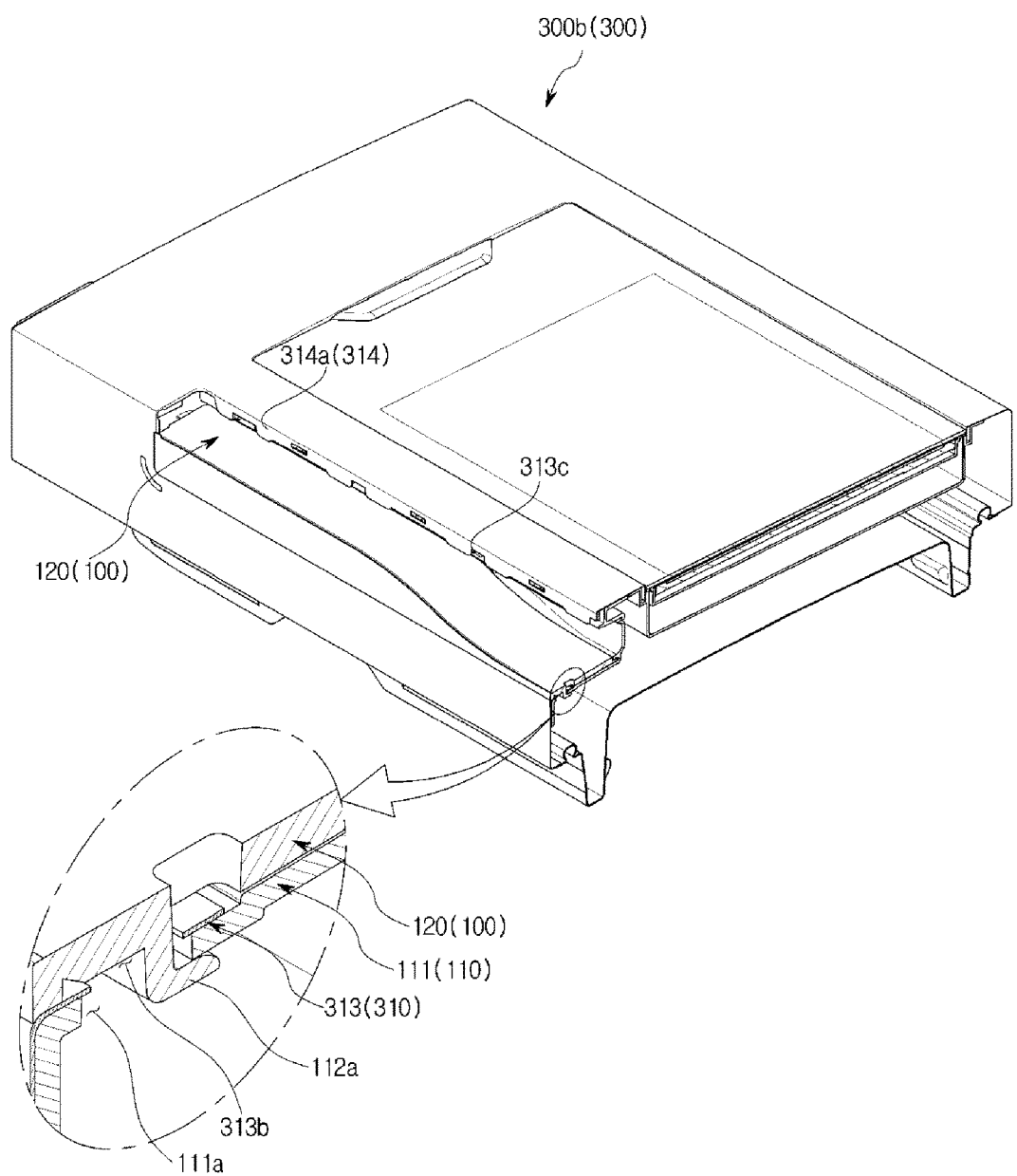
FIG. 12 is a view of the door of the refrigerator cut along B-B' of FIG. 11, according to an embodiment of the present disclosure.

FIG. 11 is a perspective view of a second handle member of a handle connected to a door frame and a first handle member of the handle, according to an embodiment of the present disclosure, and FIG. 12 is a view of the door of the refrigerator cut along B-B' of FIG. 11, according to an embodiment of the present disclosure.

As shown in FIGS. 11 and 12, the second handle member 120 may be fixedly connected to the first handle member 110.

The second handle member 120 is located in front of the first combining frame 313 to cover the first connector 113a of the connecting frame 113 exposed through the opening 312. Specifically, the second handle member 120 is located ahead of the first combining frame 313 to match the plurality of fixing fasteners 112a formed on the one face 120a of the second handle member 120, the first combining holes 313b of the first combining frame 313, and the first fastening holes 111a of the first fixing frame 111.

The plurality of fixing fasteners 112a formed on the one face 120a of the second handle member 120 are connected into the first fastening holes 111a of the first fixing frame 111 after passing through the first combining holes 313b of the first combining frame 313.

The first handle member 110 is fixedly connected secondly with the door frame 310 through connection between the plurality of fixing fasteners 112a and the first fastening holes 111a.

Figure 13:
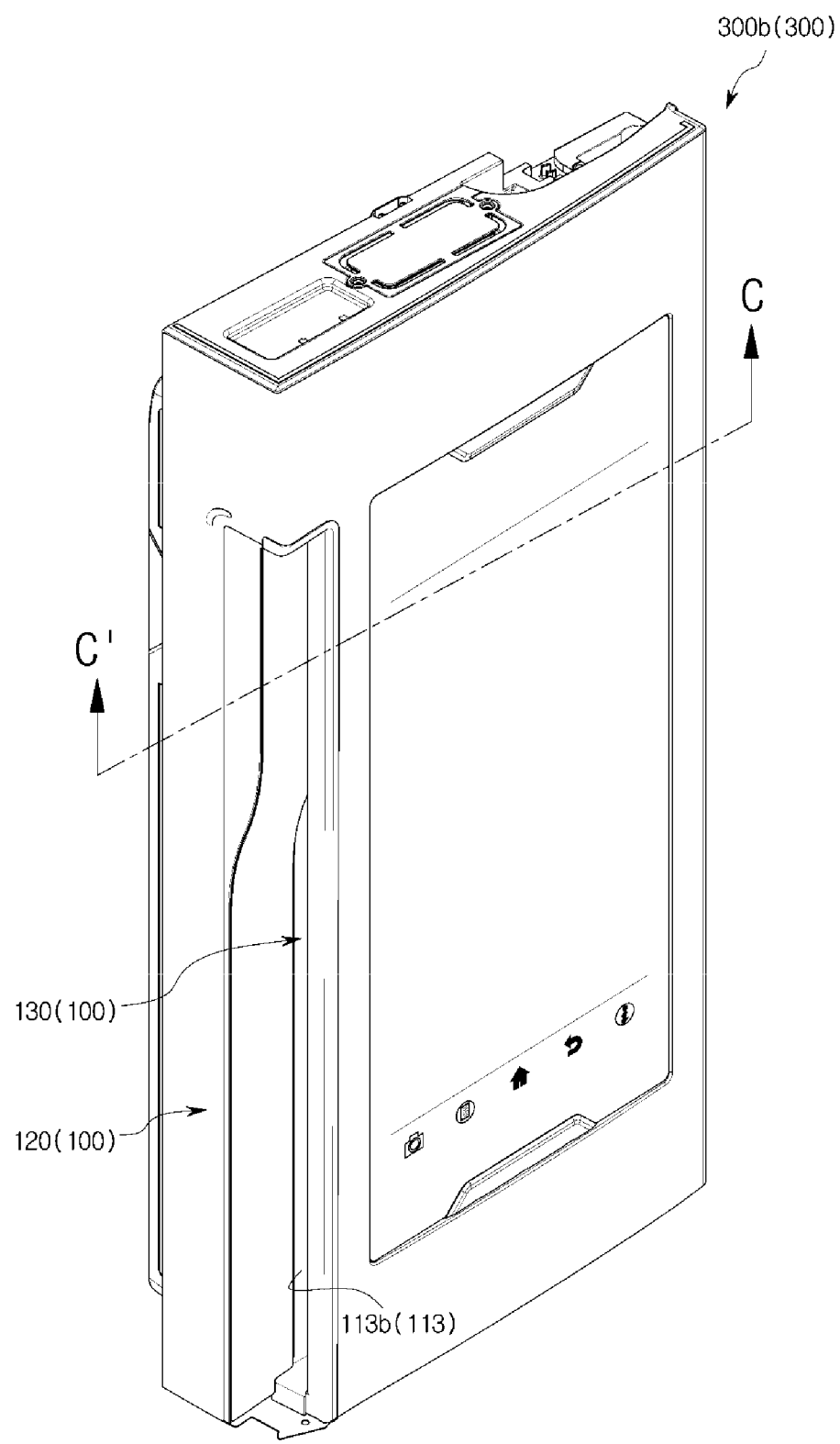
FIG. 13 is a perspective view of a third handle member of a handle connected to a door frame and a first handle member of the handle, according to an embodiment of the present disclosure.
Figure 14:
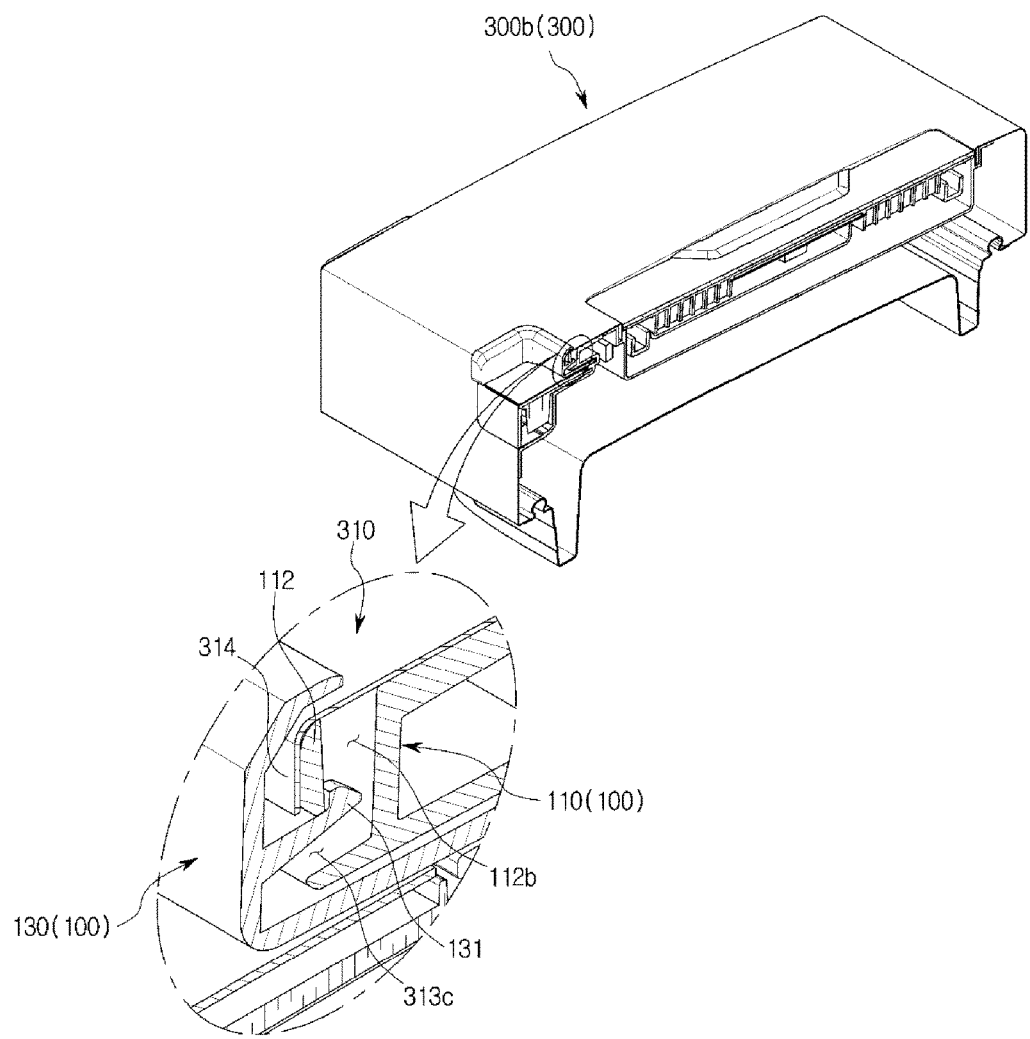
FIG. 14 is a view of the door of the refrigerator cut along C-C' of FIG. 13, according to an embodiment of the present disclosure.

FIG. 13 is a perspective view of a third handle member of a handle connected to a door frame and a first handle member of the handle, according to an embodiment of the present disclosure, and FIG. 14 is a view of the door of the refrigerator cut along C-C' of FIG. 13, according to an embodiment of the present disclosure.

As shown in FIGS. 13 and 14, the third handle 130 may be fixedly connected to the first handle member 110.

The third handle member 130 is located on the left to the second combining frame 314 to match the plurality of fixing combiners 131 formed on one face 130a of the third handle member 130, the plurality of via holes 313c of the second combining frame 314, and the second fastening holes 112b of the second fixing frame 112.

The plurality of fixing combiners 131 formed on one face 130a of the third handle member 130 are connected into the second fastening holes 112b of the second fixing frame 112 after passing through the plurality of via holes 313c of the second combining frame 314.

Figure 15:
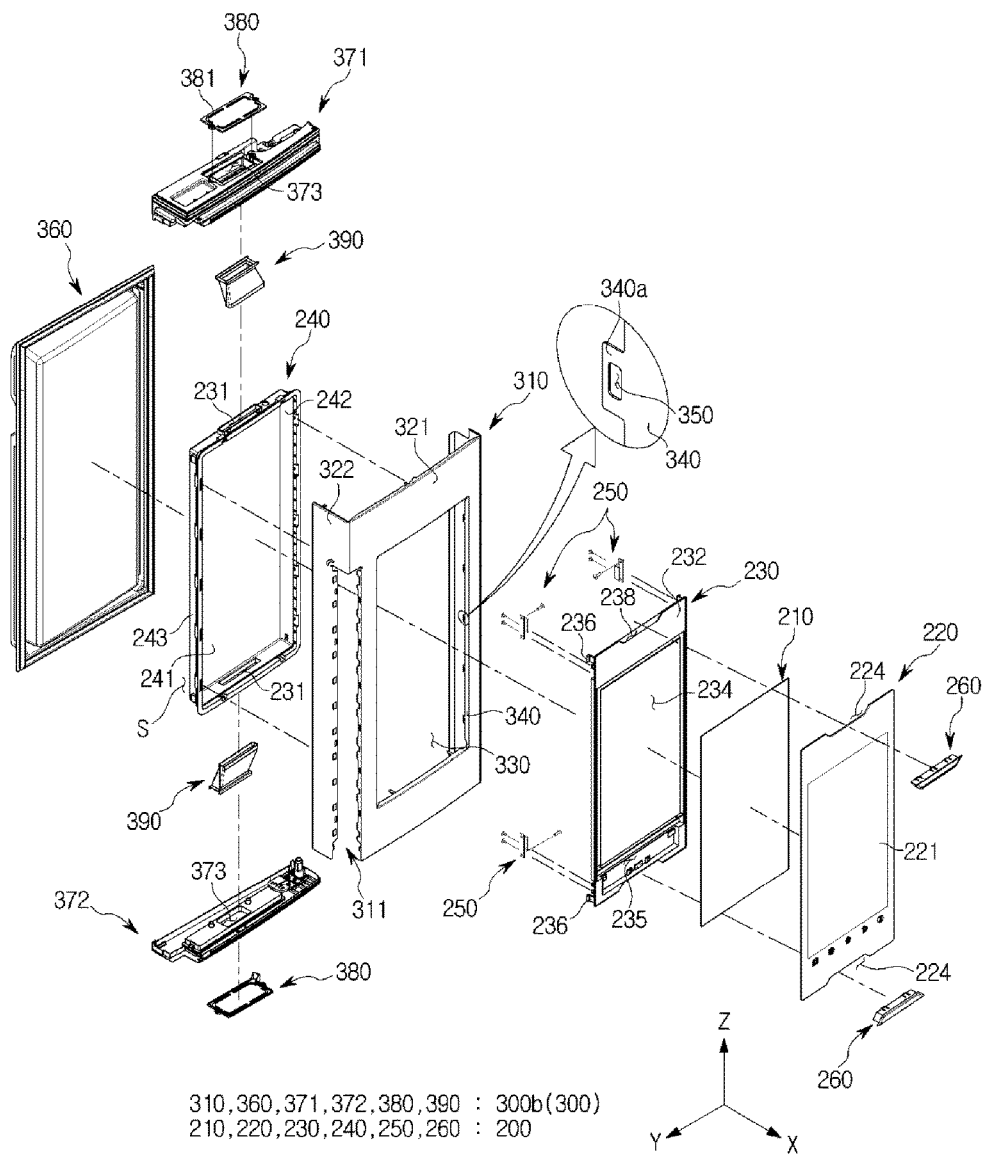
FIG. 15 is an exploded view illustrating a door of a refrigerator with a handle omitted, according to an embodiment of the present disclosure.
Figure 16:
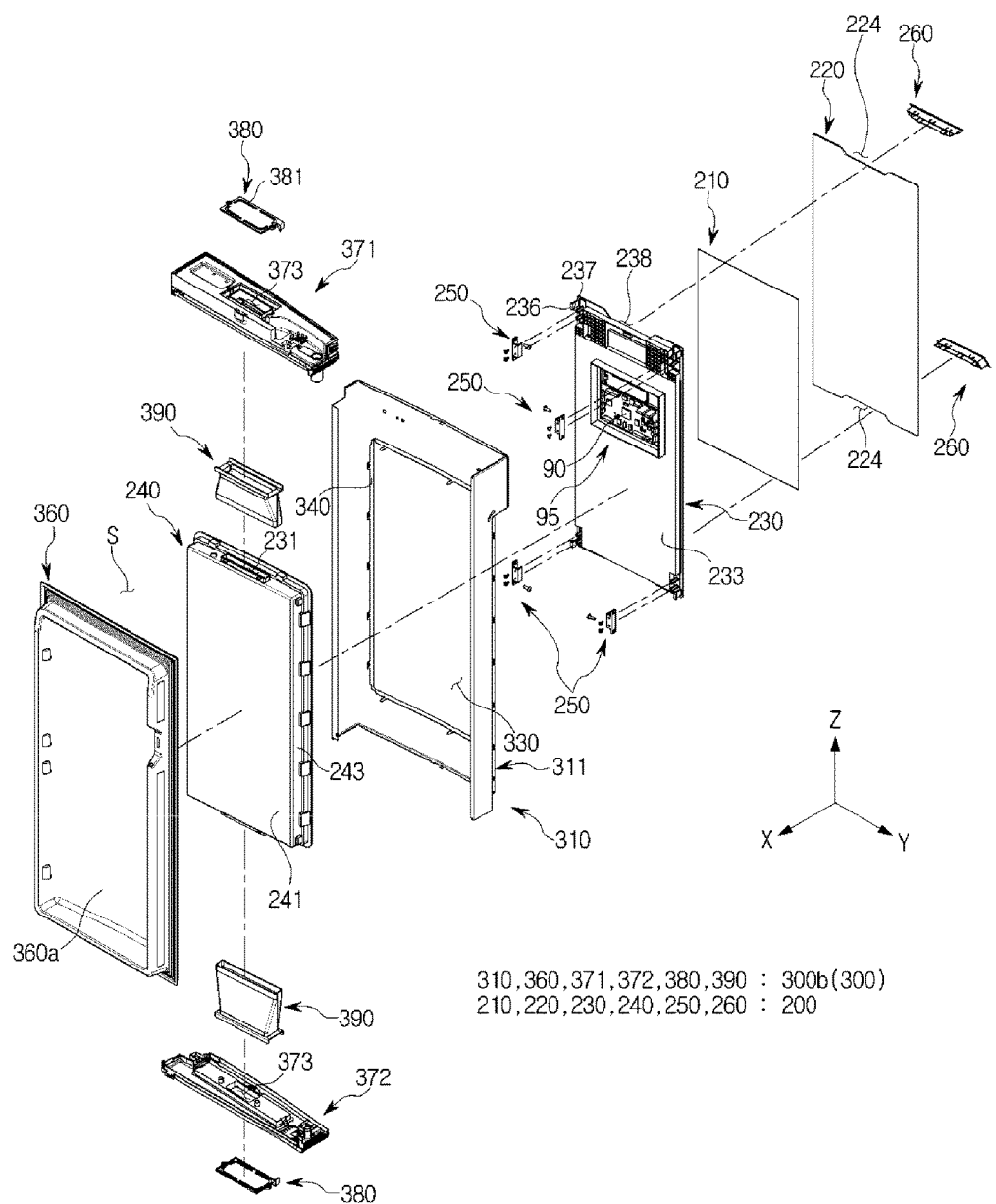
FIG. 16 is an exploded view illustrating a different angle of the door of FIG. 15 with the handle of the refrigerator omitted, according to an embodiment of the present disclosure.
Figure 17:
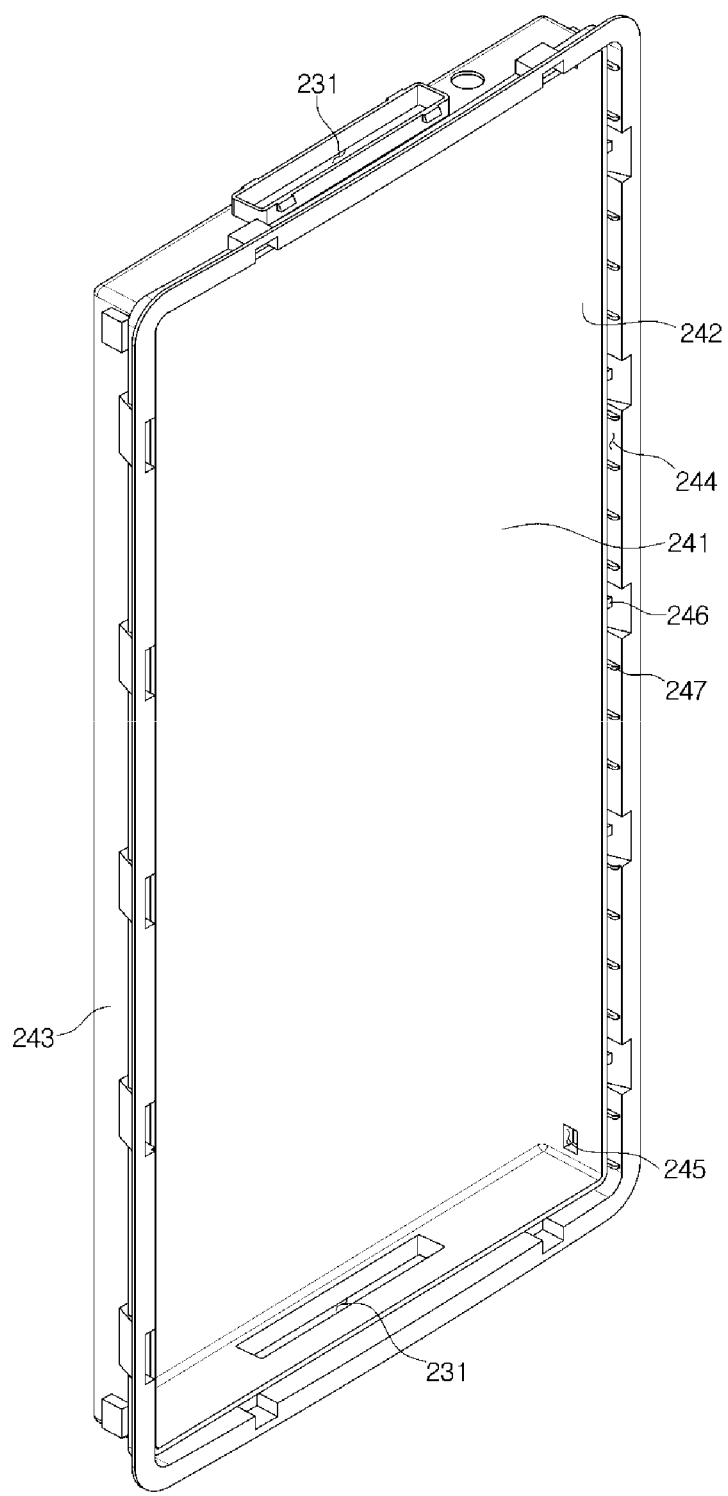
FIG. 17 is a perspective view of a display unit case of a refrigerator, according to an embodiment of the present disclosure.
Figure 18:
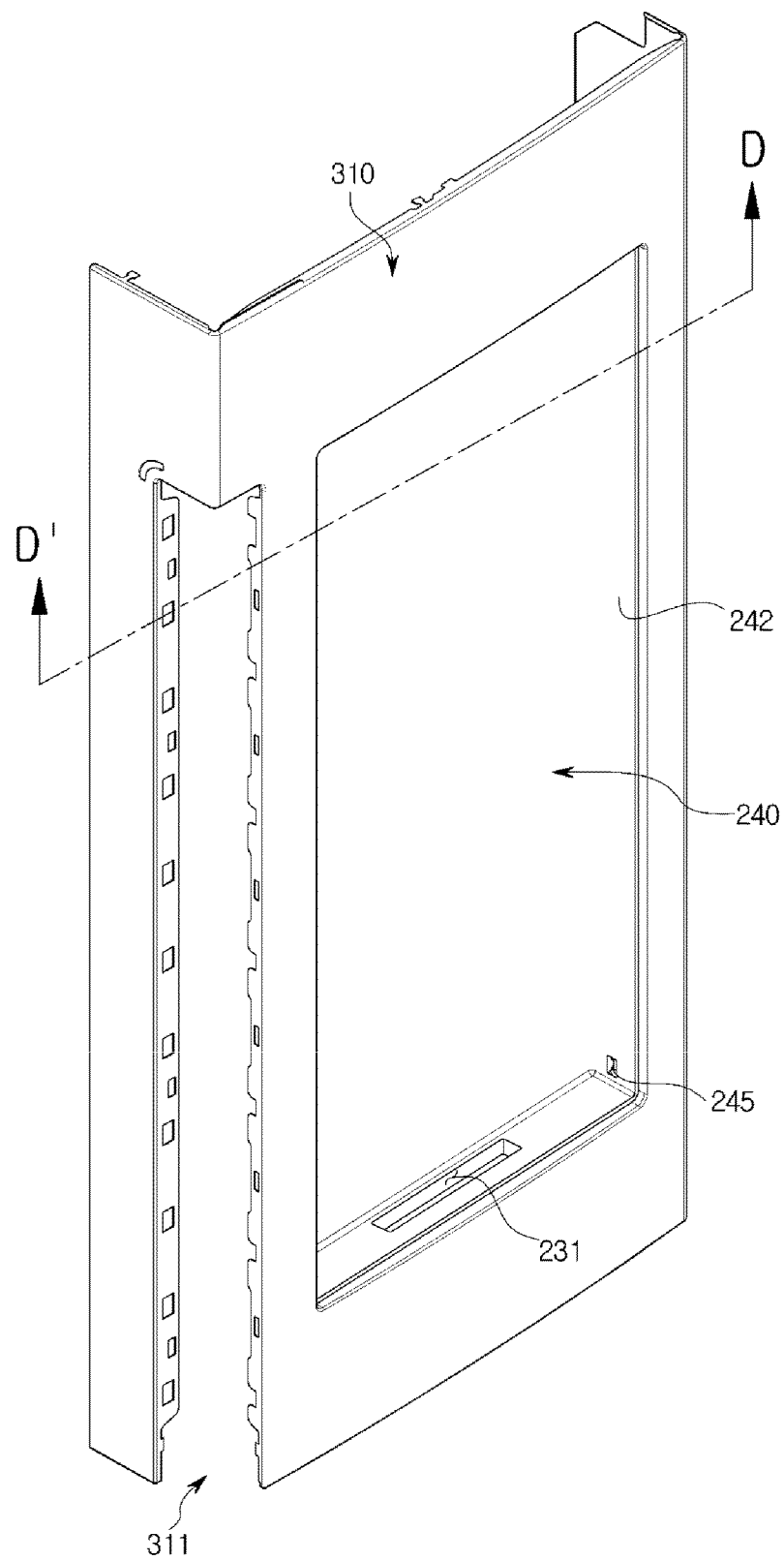
FIG. 18 is a view of a connected door frame and display unit case of a refrigerator, according to an embodiment of the present disclosure.
Figure 19:
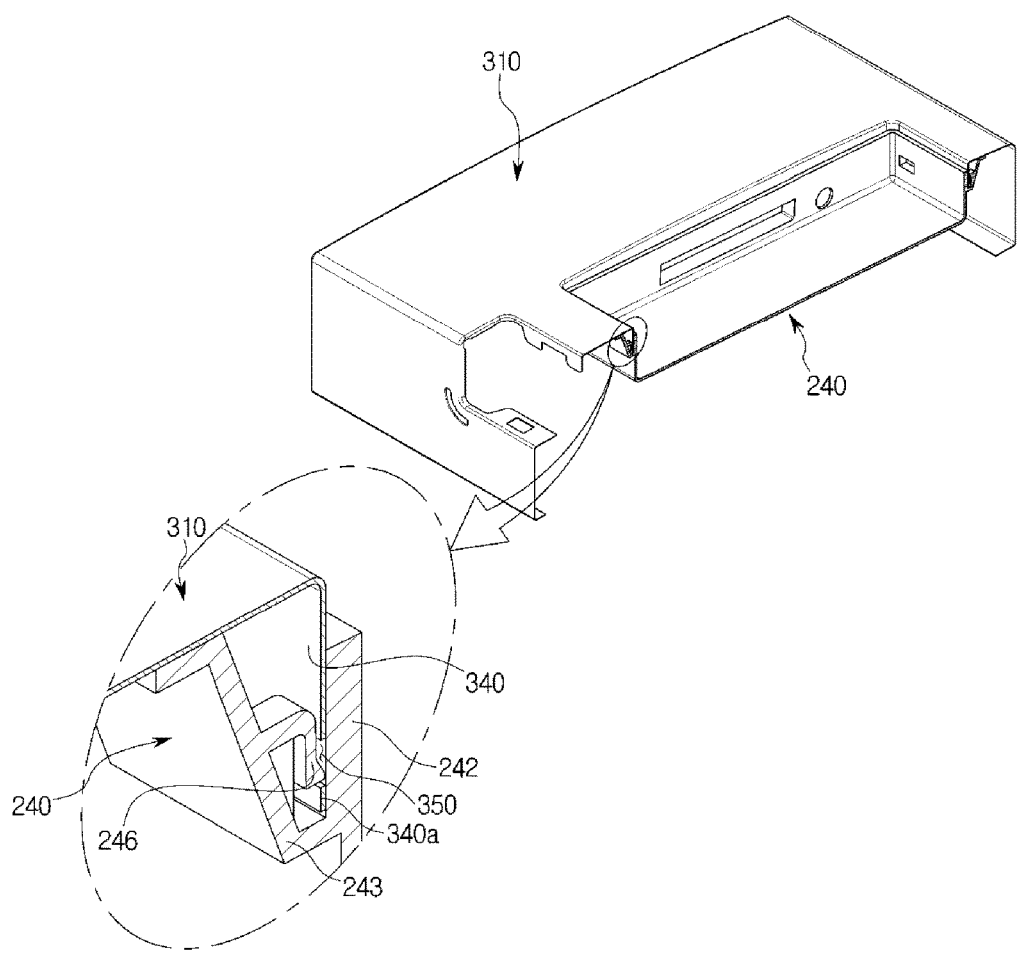
FIG. 19 is a view of a part of the refrigerator cut along D-D' of FIG. 18 to show a connected structure of the door frame and display unit case, according to an embodiment of the present disclosure.
Figure 20:
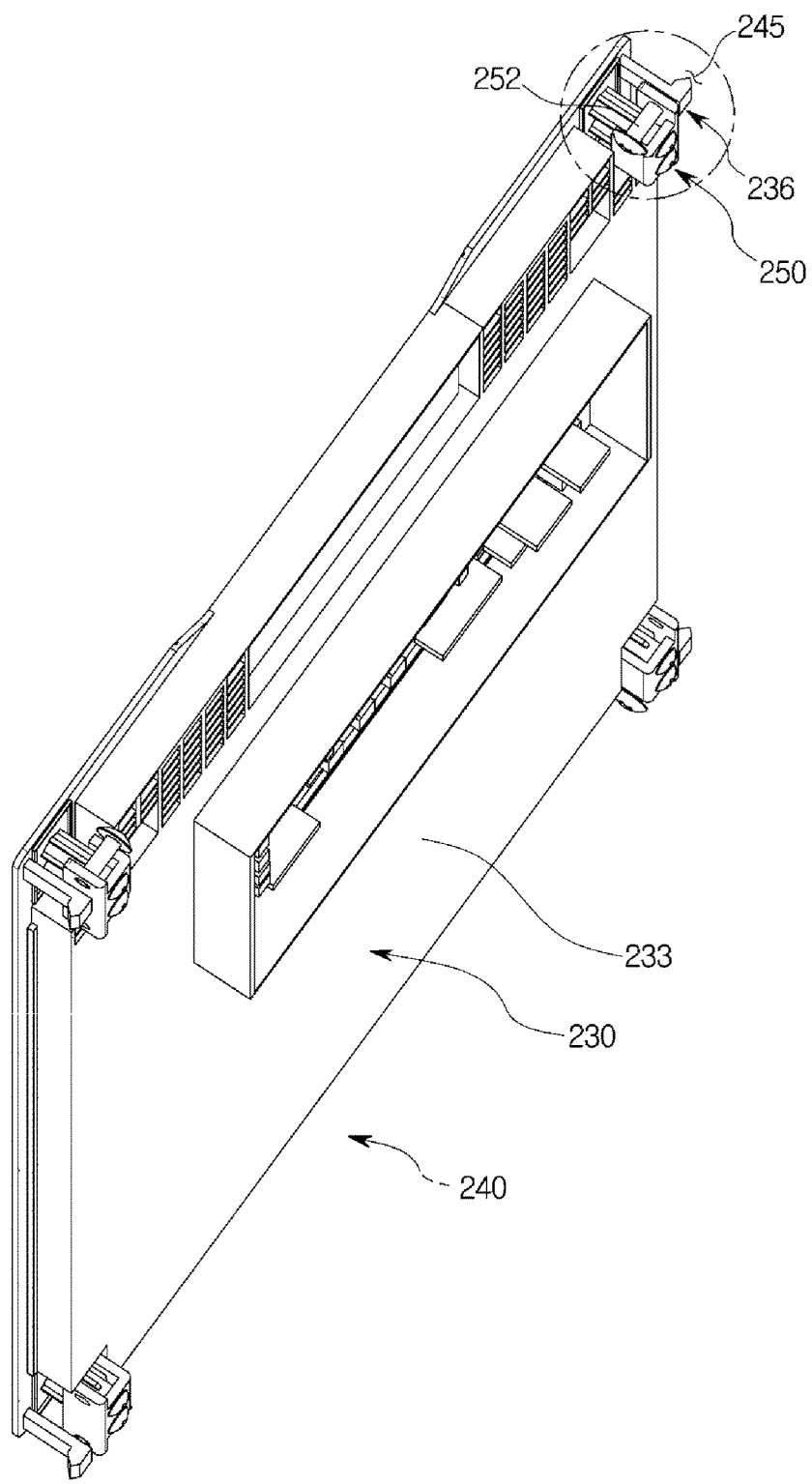
FIG. 20 is a view of a connected display case and display unit case by a fixing unit in a refrigerator, according to an embodiment of the present disclosure.
Figure 21:
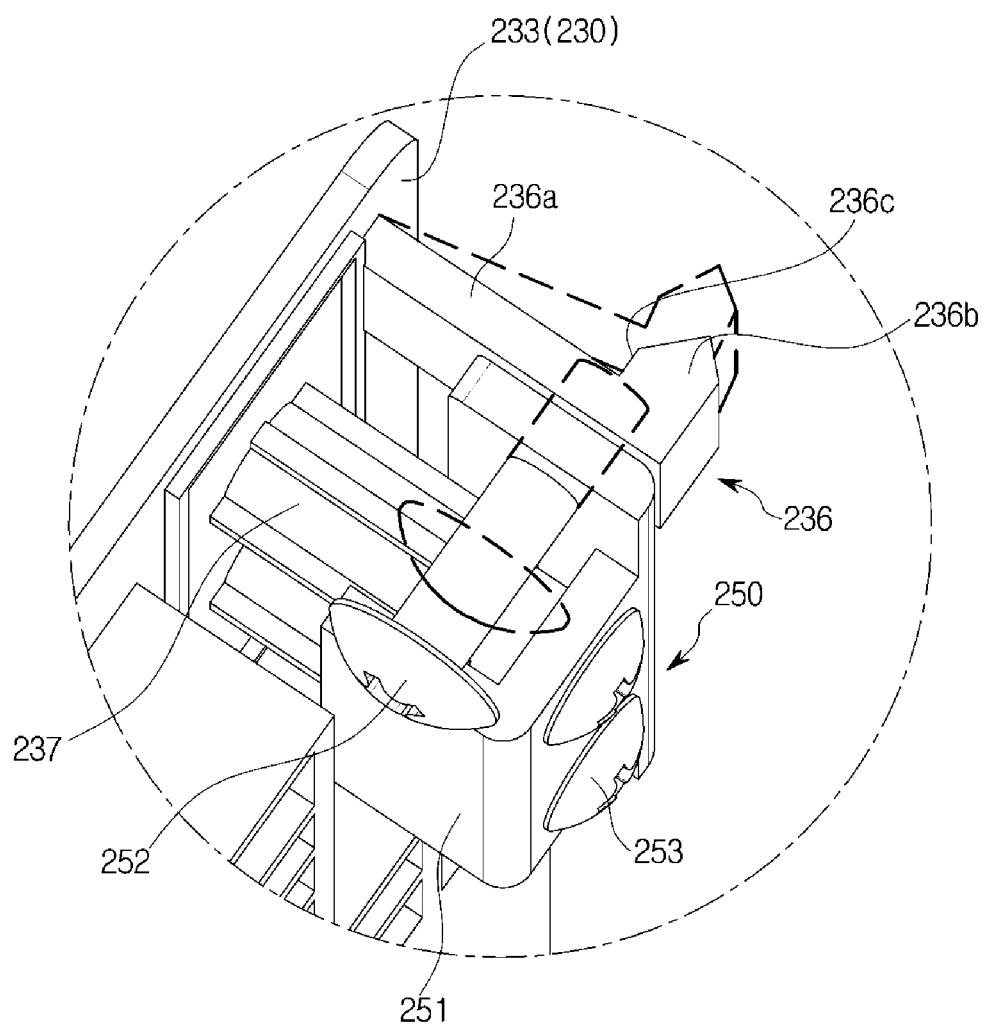
FIG. 21 is an enlarged view of a part of FIG. 20.

FIG. 15 is an exploded view illustrating a door of a refrigerator with a handle omitted, according to an embodiment of the present disclosure, and FIG. 16 is an exploded view illustrating a different angle of the door of FIG. 15 with the handle of the refrigerator omitted, according to an embodiment of the present disclosure. FIG. 17 is a perspective view of a display unit case of a refrigerator, according to an embodiment of the present disclosure, and FIG. 18 is a view of a connected door frame and display unit case of a refrigerator, according to an embodiment of the present disclosure. FIG. 19 is a view of a part of the refrigerator cut along D-D' of FIG. 18 to show a connected structure of the door frame and the display unit case, according to an embodiment of the present disclosure, and FIG. 20 is a view of a display case and a display unit case connected by a fixing unit in a refrigerator, according to an embodiment of the present disclosure. FIG. 21 is an enlarged view of a part of FIG. 20. What are overlapped with FIGS. 1 to 14 will be omitted in the following description. Reference numerals not shown herein may be referred to from FIGS. 1 to 14.

As shown in FIGS. 15 to 21, the door 300 may include the door frame 310.

The door frame 310 may form the exterior of the door 300. Specifically, the door frame 310 may include a front part 321 forming the front exterior of the door 300, and side parts 322 forming the side exterior of the door 300. As will be described later, the top exterior of the door 300 may be formed by a first door cap 371, and the bottom exterior of the door 300 may be formed by a second door cap 372. Furthermore, the rear exterior of the door 300 may be formed by a door panel 360.

The door frame 310 may include a display unit mounter 330 in which the display unit 200 is mounted. Specifically, the display unit case 240 may be mounted in the display unit mounter 330. The display unit mounter 330 may be formed on the front part 321 of the door frame 310.

The door frame 310 may further include an insert frame 340. The insert frame 340 may extend from the edge of the display unit mounter 330 toward the back of the refrigerator 1.

The door frame 310 may further include a plurality of combiners 350 formed in the insert frame 340. Specifically, the plurality of combiners 350 may be formed in a plurality of combining pieces 340a each extending from an end of the insert frame 340 toward the back of the refrigerator 1. The plurality of combiners 350 may have the form of holes.

The door frame 310 may further include the handle mounter 311 in which the handle 100 is mounted. The handle mounter 311 may be formed on one side 322 of the door frame 310.

The door 300 may further include the door panel 360. The door panel 360 may have one side 360a facing the storeroom 20. On the one side 360a of the door panel 360 facing the storeroom 20, there may be at least one door pocket 25 installed to contain things like various spices or drinks.

The door panel 360 may be connected to the door frame 310. Specifically, the door panel 360 may be connected to the door frame 310 to be located in the back of the door frame 310.

The door frame 310 and the door panel 360 may have an insulation space S therein packed with an insulation material. Specifically, the insulation space S may be formed by the door frame 310, the display unit case 240 mounted in the display unit mounter 330, the handle 100 mounted in the handle mounter 311, the plurality of door caps 371, 372, and the door panel 360.

The door 300 may further include the plurality of door caps 371,372. The plurality of door caps 371, 372 may include the first door cap 371 connected on the top of the door frame 310 and the second door cap 372 connected on the bottom of the door frame 310. An air flow unit 373 may be formed in the plurality of door caps 371, 372.

The door 300 may further include a plurality of door cap covers 380. The plurality of door cap covers 380 may be connected to the plurality of door caps 371, 372 to cover the air flow unit 373. At least one slit 381 may be formed in the plurality of door cap covers 380 to pass air.

The door 300 may further include a plurality of ducts 390 to release heat generated from the display unit 200. The plurality of ducts 390 may be arranged inside the door 300. The plurality of ducts 390 may be arranged inside the door 300 to connect the air flow unit 373 formed in the plurality of door caps 371, 372 and an air move unit 231 formed in the display unit case 240. The air move unit 231, the plurality of ducts 390, the air flow unit 373, and the at least one slit 381 may be connected together to pass air.

To put it from a different perspective, the refrigerator 1 may further include a heat radiation structure. The heat radiation structure may be arranged inside the door 300 to radiate heat generated from the display unit 200. The heat radiation structure may include the air move unit 231 formed in the unit case 240, the plurality of ducts 390, the air flow unit 373 formed in the plurality of door caps 371, 372, and at least one slit 381 formed in the plurality of door cap covers 380. The air inside and outside the door 300 may circulate through the heat radiation structure, and the heat generated from the display unit 200 may be released out of the door 300 during the air circulation.

The refrigerator 1 may further include the display unit 200. The display unit 200 may be installed in the door 300.

The display unit 200 may include the display 210 for displaying images. The display 210 may further include an LCD.

The display unit 200 may further include the display glass 220. The display glass 220 may be located on the front of the display 210. The display glass 220 may form the touch screen 221.

The display unit 200 may further include the display case 230 with the display mounter 234 for the display 210 to be mounted therein.

The display case 230 may include a first face 232 directed forward of the refrigerator 1, and a second face 233 directed backward of the refrigerator 1.

The display mounter 234 may be formed to be sunken from the first face 232. Furthermore, on the first face 232, there may be an internal parts arrangement unit 235 formed to place internal parts, such as the camera 60, the proximity detection sensor 50, etc. The internal parts arrangement unit 235 may be formed to be sunken from the first face 232 to be located below the display mounter 234.

A pressing piece 236 may be formed on the rear side of the display case 230 opposite to the display unit case 240 to extend from the rear side of the display case 230. In other words, the pressing piece 236 may be formed on the second face 233 of the display case 230 to extend from the second face 233 toward the back of the refrigerator 1. The pressing piece 236 may be formed on the edge of the second face 233. Preferably, there may be four pressing pieces 236 formed on the edge of the second face 233. The four pressing pieces 236 may be formed on the top right edge, bottom right edge, top left edge, and bottom left edge, respectively.

The pressing piece 236 may include a supporter 236a formed by extending from the second face 233 of the display case 230 toward the back of the refrigerator 1, and an extension 236b extending from the supporter 236a toward the outside of the door 300. The extension 236b may be bent from the supporter 236a toward the outside of the door 300. Specifically, the extension 236b may be bent from the supporter 236a to the left or right of the door 300. A hook 236c may be formed at one end of the extension 236b toward the outside of the door 300 to be fixedly connected to a fixing groove 245.

A supporting boss 237 may be formed on the second face 233 of the display case 230. A fixing unit 250, as will be described later, may be fixedly connected to the supporting boss 237. The supporting boss 237 may be formed inside of the door 300 to be adjacent to the pressing piece 236. The supporting boss 237 may extend from the second face 233 to protrude toward the back of the refrigerator 1.

At least one circuit board 95 including the microcomputer 90 may be arranged in the display case 230. The at least one circuit board 95 including the microcomputer 90 may be arranged on the second face 233 of the display case 230.

The display unit 200 may further include the display unit case 240 fixedly connected to the door 300. Specifically, the display unit case 240 may be fixedly connected on the back of the door frame 310.

The display unit case 240 may have the form of a box with the front open to receive the display case 230.

To put it from a different perspective, the display unit case 240 may include a base 241, and a plurality of side walls 242, 243 formed along the circumference of the base 241 to protrude toward the front of the refrigerator 1.

The plurality of side walls 242, 243 may include an inner wall 242 and an outer wall 243 formed outside of the inner wall 242. The outer wall 243 may be formed to cover the inner wall 242 from outside.

The outer wall 243 may be separately formed outside of the inner wall 242 with an insert space 244 formed between the outer wall 243 and the inner wall 242, into which the insert frame 340 is inserted.

The fixing groove 245 may be formed on the inner wall 242 to be fixedly connected to the pressing piece 236.

A plurality of latches 246 may be formed on at least one of the inner wall 242 and the outer wall 243. Specifically, the plurality of latches 246 may be formed on at least one of the inner face of the outer wall 243 facing the inner wall 242 and the outer face of the inner wall 242 facing the outer wall 243. The plurality of latches 246 may be fixedly connected to the plurality of combiners 350. The plurality of latches 246 may be hooked into the plurality of combiners 350. Through the combination of the plurality of latches 246 and the plurality of combiners 350, the display unit case 240 may be fixedly connected to the door frame 310.

A plurality of guide projections 247 may be formed on at least one of the inner wall 242 and the outer wall 243. Specifically, the plurality of guide projections 247 may be formed on at least one of the inner face of the outer wall 243 facing the inner wall 242 and the outer face of the inner wall 242 facing the outer wall 243. The plurality of guide projections 247 guide insertion of the insert frame 340 to the insert space 244. Preferably, the plurality of latches 246 and the plurality of guide projections 247 may be formed on the plurality of side walls 242, 243 to face each other. When the plurality of latches 246 are formed on at least one of the inner face of the outer wall 243 facing the inner wall 242 and the outer face of the inner wall 242 facing the outer wall 243, the plurality of guide projections 247 may be formed on the other one of the inner face of the outer wall 243 facing the inner wall 242 and the outer face of the inner wall 242 facing the outer wall 243.

The display unit 200 may further include the fixing unit 250 to combine the display case 230 fixedly with the display unit case 240.

The fixing unit 250 may combine the display case 230 fixedly with the display unit case 240 by pressing part of the display case 230.

The fixing unit 250 may include a fixed body 251 and the pressing member 252.

The fixed body 251 may be fixed on the rear face of the display case 230, which faces the display unit case 240. That is, the fixed body 251 may be fixed on the second face 233 of the display case 230. Specifically, the fixed body 251 may be fixed by a fixing screw 253 to the support boss 237 formed on the second face 233 of the display case 230.

The pressing member 252 may pass through the fixed body 251 and press the pressing piece 236 toward the outside of the refrigerator 1. The pressing piece 236 may be fixedly connected into the fixing groove 245 formed on the inner side of the display unit case 240 by being pressed by the pressing member 252 of the fixing unit 250.

The display unit 200 may further include a combining cover 260. The combining cover 260 is designed for convenience of assembling of the display unit 200. The combining cover 260 may be connected to the display case 230. The display glass 220 and the display case 230 may have dents 224, 238 shaped to correspond to the combining cover 260. A tool (not shown) to press the pressing member 252 toward the pressing piece 236 may be inserted to the space formed by the dent 224 on the display glass 220 and the dent 238 on the display case 230. After the pressing piece 236 is fixedly connected into the fixing groove 245 using the tool, the space formed by the dent 224 on the display glass 220 and the dent 238 on the display case 230 may be shut by the combining cover 260.

As shown in FIGS. 4 and 15, the display glass 220 may be attached to the display case 230 to form the front exterior of the door 300 together with the door frame 310. Specifically, the display glass 220 may be attached along the edge of the first face 232 of the display case 230. The display glass 220 may be attached along the edge of the first face 232 of the display case 230 by at least one of liquid adhesive and double sided adhesive.

The display glass 220 may be attached to the display case 230 such that it is separated by a certain gap t from the edge of the display unit mounter 330 to the inside of the door 300. In the case of attaching the display glass 220 to the display case 230 as described above, an extra trim structure for the display glass 220 may be omitted, thereby having a seamless smooth form between the door frame 310 and the display glass 220.

A procedure of assembling the door 300 equipped with the display unit 200 will now be described schematically.

The handle 100 is connected to the handle mounter 311 of the door frame 310. The display unit case 240 is then connected to the door frame 310 such that the display unit case 240 is located behind the door frame 310. The insert frame 340 of the door frame 310 is guided into the insert space 244 by the plurality of guide projections 247 formed in the display unit case 240, and the plurality of latches 246 formed in the display unit case 240 are hooked into the plurality of combiners 350 formed in the insert frame 340. After completion of combining the display unit case 240 and the door frame 310, the plurality of door caps 371, 372 and the door panel 360 are connected to the door frame 310. Then, after the display 210 is mounted in the display mounter 234 of the display case 230, the display glass 220 is attached to the display case 230 such that the display glass 230 is located on the front of the display 210. After that, the display case 230 is placed inside the display unit case 240 such that the display case 230 is located in front of the display unit case 240. The pressing member 252 is then pressed toward the pressing piece 236 to combine the display case 230 and the display unit case 240 by inserting a tool (not shown) to the space formed by the dent 224 on the display glass 220 and the dent 238 on the display case 230. Once the combination of the display case 230 and the display unit case 240 is completed by fixedly combining the hook 236c of the pressing piece 236 into the fixing groove 245, the space formed by the dent 224 on the display glass 220 and the dent 238 on the display case 230 is shut by the combining cover 260.

Figure 22:
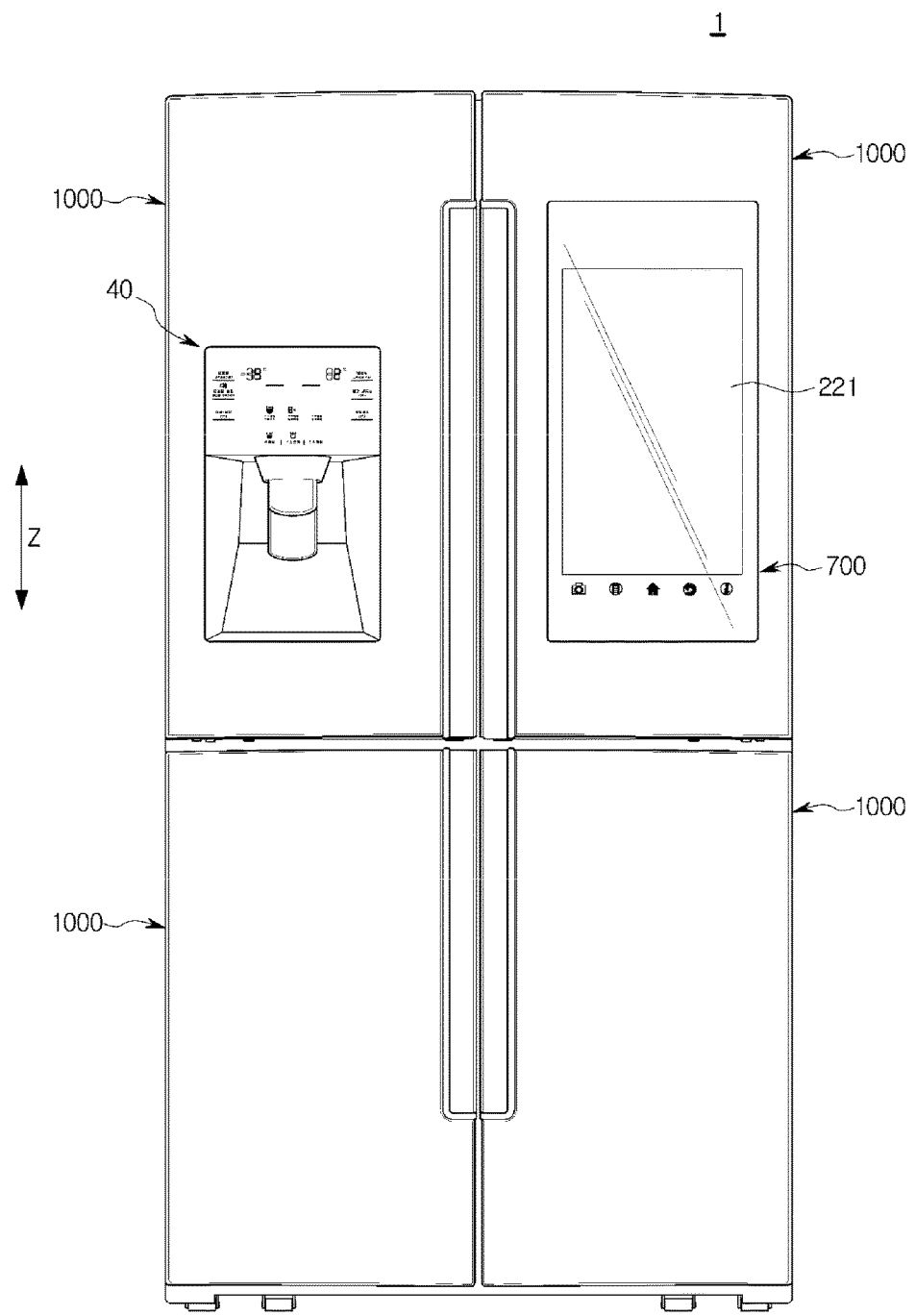
FIG. 22 is a front view of a refrigerator, according to another embodiment of the present disclosure.
Figure 23:
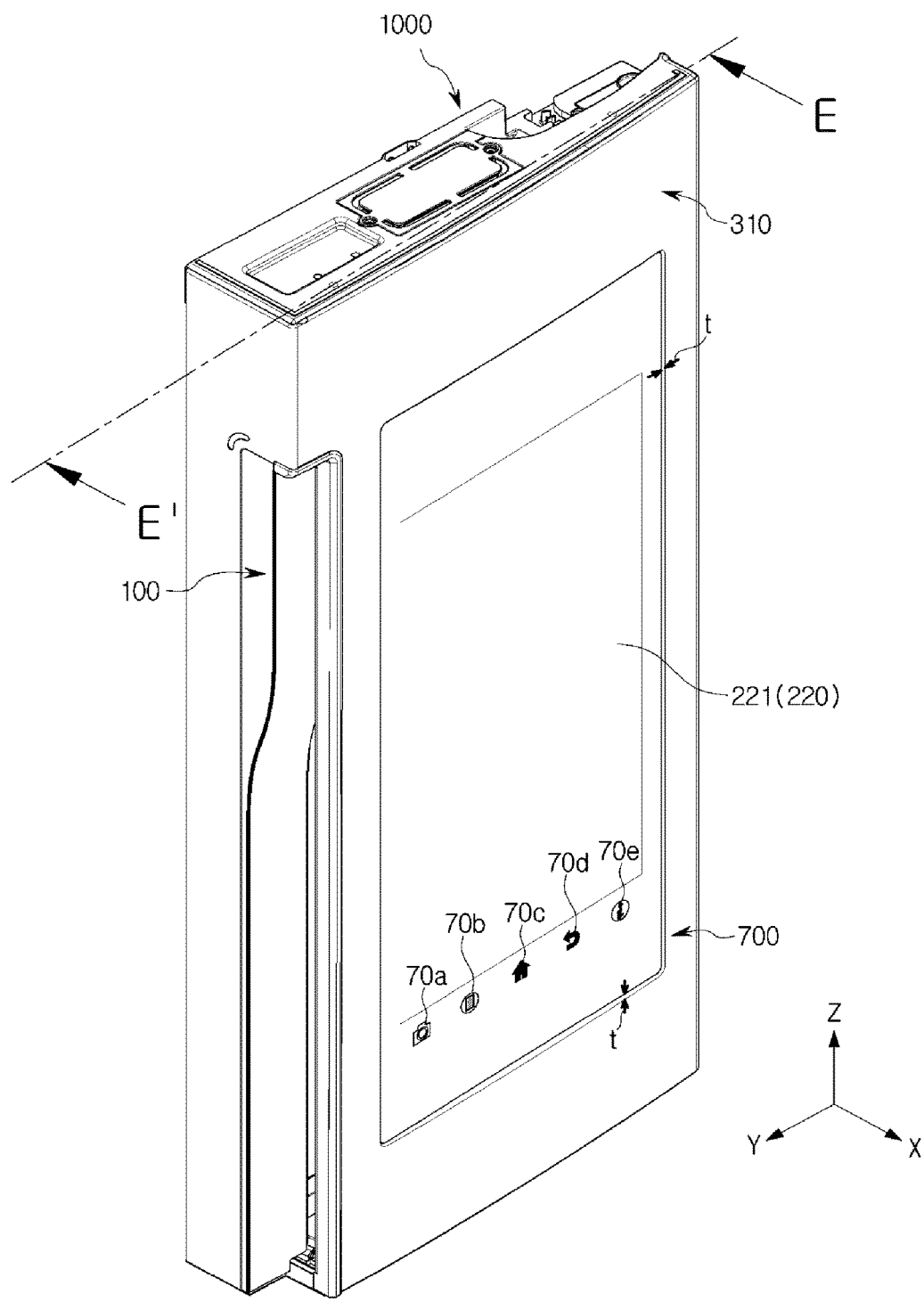
FIG. 23 is a perspective view of a door of a refrigerator, according to another embodiment of the present disclosure.

FIG. 22 is a front view of a refrigerator, according to another embodiment of the present disclosure, and FIG. 23 is a perspective view of a door of a refrigerator, according to another embodiment of the present disclosure. What are overlapped with FIGS. 1 to 21 will be omitted in the following description. Furthermore, the elements of the same names as those in FIGS. 1 to 21 will be denoted by the same reference numerals.

As shown in FIGS. 22 and 23, if the method of assembling the display case 230 and the display unit case 240 is modified, the display unit 200 has a different appearance than the display unit 200 shown in FIG. 1.

In a case where the display unit case 240 and the display case 230 are connected together in the up-and-down direction Z of the door 300, the combining cover 260, the dent of the display glass 220, and the dent 238 of the display case 230 may be omitted. Accordingly, a more expanded touch screen 221 may be implemented. Furthermore, the display unit 200 may have a smarter design in appearance.

A method of combining the display unit case 240 and the display case 230 in the up-and-down direction Z of the door 300 will now be described.

Figure 24:
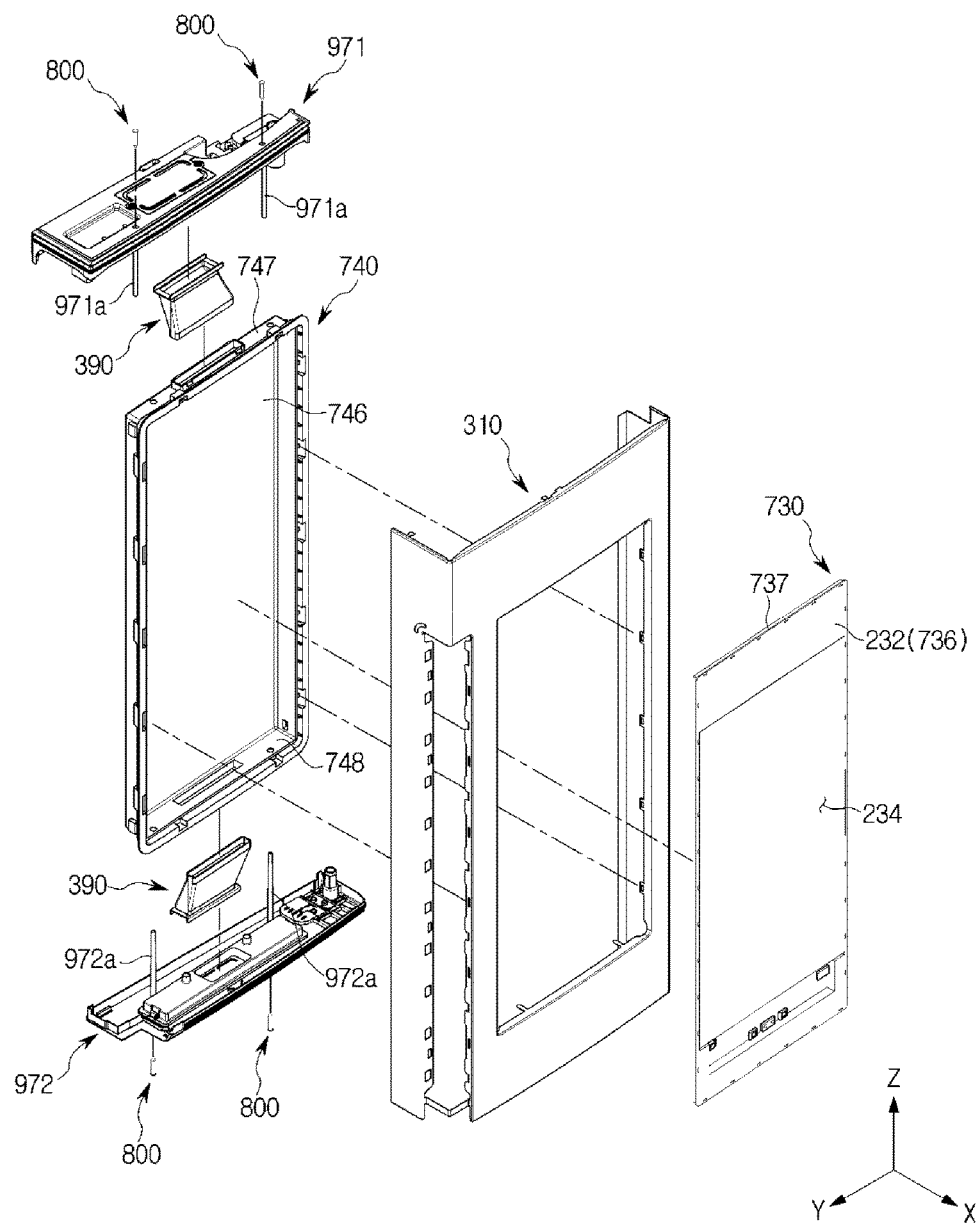
FIG. 24 is an exploded view illustrating combination relations between a door cap, a display unit case, and a display case by a fixing member in a refrigerator, according to another embodiment of the present disclosure.
Figure 25:
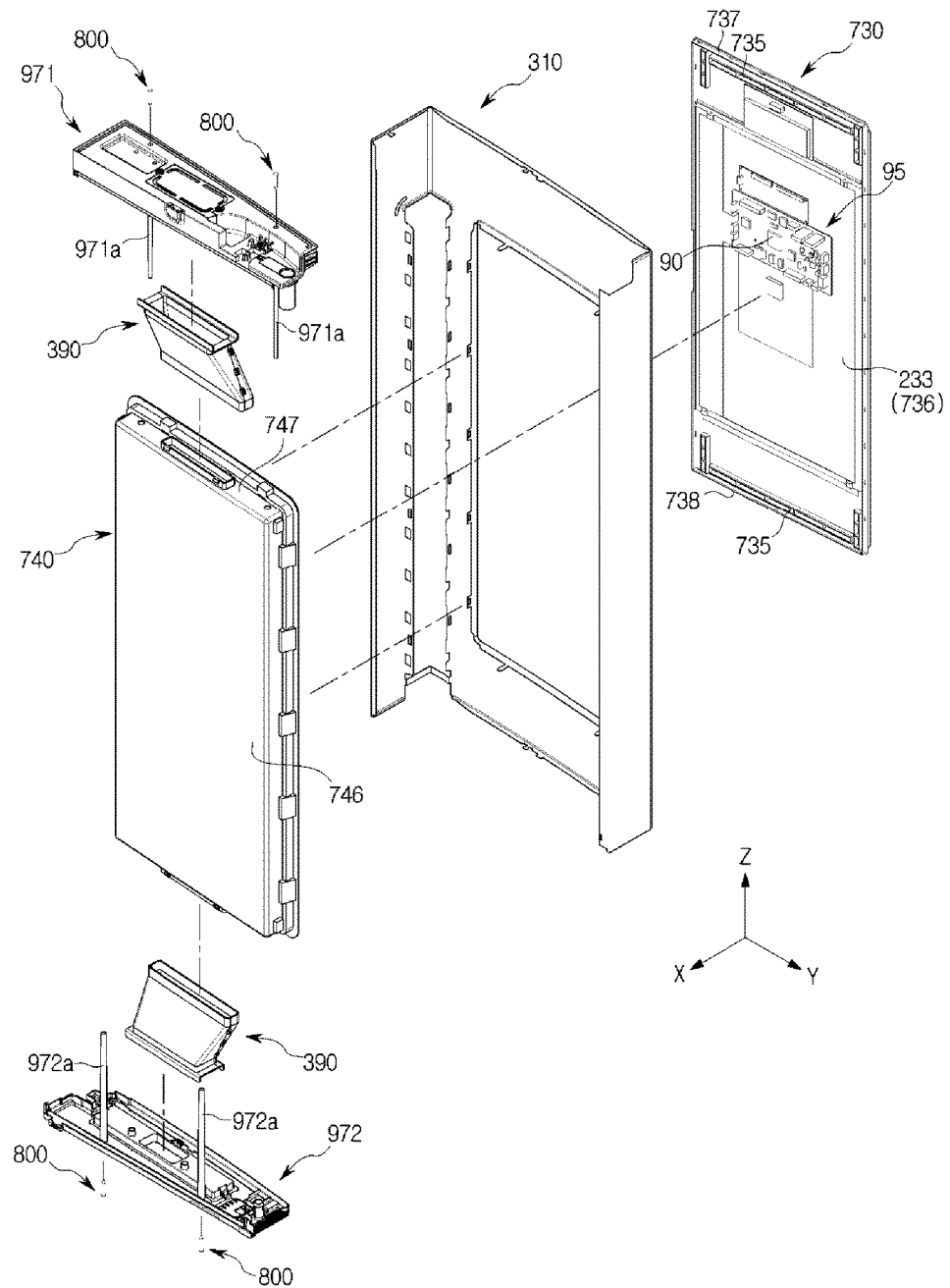
FIG. 25 is an exploded view illustrating combination relations between the door cap, the display unit case, and the display case by the fixing member in the refrigerator, viewed from a different angle from that of FIG. 24, according to another embodiment of the present disclosure.
Figure 26:
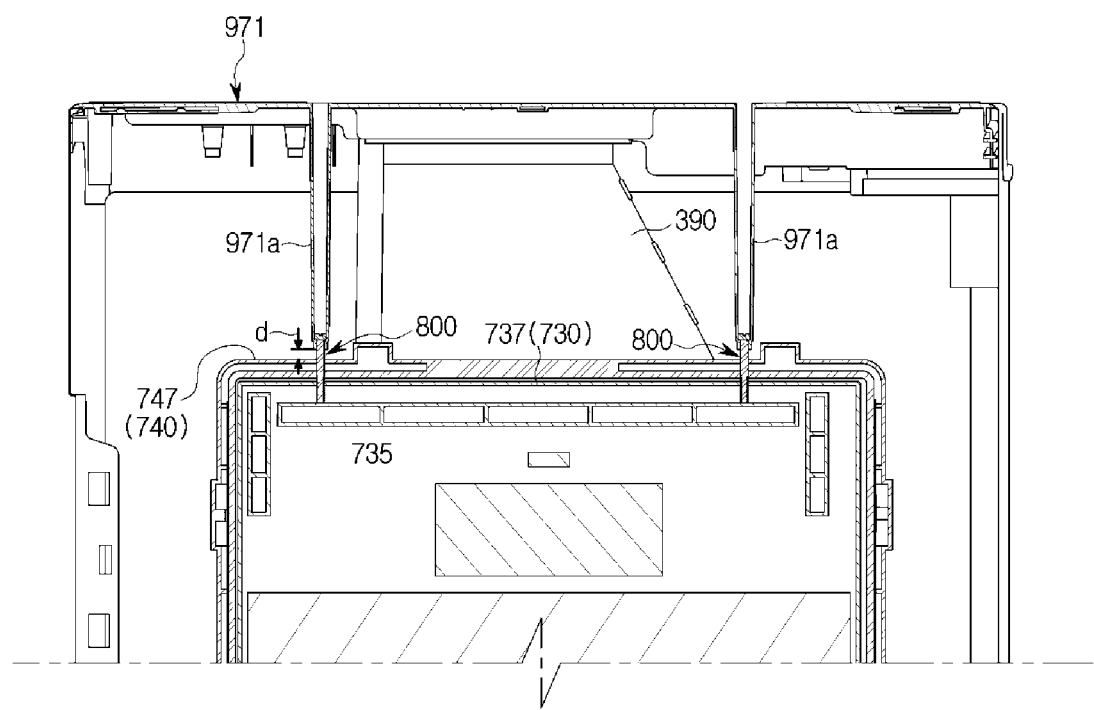
FIG. 26 is a view of the door of the refrigerator cut along E-E' of FIG. 23, according to another embodiment of the present disclosure.

FIG. 24 is an exploded view illustrating combination relations between a door cap, a display unit case, and a display case by a fixing member in a refrigerator, according to another embodiment of the present disclosure, and FIG. 25 is an exploded view illustrating combination relations between the door cap, the display unit case, and the display case by the fixing member in the refrigerator, viewed from a different angle from that of FIG. 24, according to another embodiment of the present disclosure. FIG. 26 is a view of the door of the refrigerator cut along E-E' of FIG. 23, according to another embodiment of the present disclosure. What are overlapped with FIGS. 1 to 21 will be omitted in the following description. Furthermore, the elements of the same names as those in FIGS. 1 to 21 will be denoted by the same reference numerals.

As shown in FIGS. 24 to 26, a display unit 700 may include a display case 730 with the display mounter 234 for the display 210 to be mounted therein. The display mounter 234 may be formed on the first face 232 of the display case 730.

A supporter 735 may be formed in the display case 730 to limit movement of a fixing member 800 as will be described later. The supporter 735 may be formed on the second face 233 of the display case 730. The supporter 735 may extend from the second face 233 of the display case 730 to protrude toward the back of the refrigerator 1.

The display case 730 may include a body 736 in which the display mounter 234 is arranged. Furthermore, the display case 730 may further include a top face 737 extending from the top of the body 736 to protrude toward the back of the refrigerator 1 and a bottom face 738 extending from the bottom of the body 736 to protrude toward the back of the refrigerator 1.

The display unit 700 may be fixedly connected to a door 1000, and may further include a display unit case 740 in which the display case 730 is settled.

The display unit case 740 may include a base 746 facing the body 736. Furthermore, the display unit case 740 may further include a top face 747 extending from the top of the base 746 to protrude toward the front of the refrigerator 1 and a bottom face 748 extending from the bottom of the base 746 to protrude toward the front of the refrigerator 1.

The display unit 700 may further include a fixing member 800 for fixedly combining the display unit case 740 and the display case 730 in the up-and-down direction Z of the door 1000. The fixing member 800 may include a screw.

The fixing member 800 may pass through at least one of the top and bottom faces of the door 1000 to fixedly combine the door 1000, the display unit case 740, and the display case 730. Specifically, the fixing member 800 may pass through at least one of a plurality of door caps 971, 972 to fixedly combine the door 1000, the display unit case 740, and the display case 730.

The plurality of door caps 971, 972 may include the first door cap 971 connected on the top of the door frame 310 to face the top face 747 of the display unit case 740. The plurality of door caps 972, 972 may further include the second door cap 971 connected on the bottom of the door frame 310 to face the bottom face 748 of the display unit case 740.

Bosses 971a, 972a extending inward of the door 1000 may be formed in the plurality of door caps 971, 972 in the up-and-down direction Z of the door 1000. The bosses 971a, 972a may include the first boss 971a extending downward of the door 1000 from inside of the first door cap 971 to face the top 747 of the display unit case 740. The bosses 971a, 972a may include the second boss 972a extending upward of the door 1000 from inside of the second door cap 972 to face the bottom 748 of the display unit case 740.

The bosses 971a, 972a may extend inward of the door 1000 from the plurality of door caps 971, 972 to be separated by a certain distance d from the display unit case 740. The form of the bosses 971a, 972a is, however, not limited thereto.

The fixing member 800 may pass through at least one of the first and second bosses 971a and 972a, at least one of the top and bottom faces 747 and 748 of the display unit case 740, and at least one of the top and bottom faces 737 and 738 of the display case 730 located inside the display unit case 740 one after another.

One end of the fixing member 800 that passes through the plurality of door caps 971, 972, the display unit case 740, and the display case 730 one after another may be supported by the supporter 735 arranged in the display case 730. Specifically, with the one end of the fixing member 800 passing through at least one of the first and second bosses 971a and 972a, at least one of the top and bottom faces 747 and 748 of the display unit case 740, and at least one of the top and bottom faces 737 and 738 of the display case 730 one after another supported by the supporter 735, movement of the fixing member 800 in the up-and-down direction Z of the door 1000 is limited.

Preferably, the fixing member 800 may include a first fixing member passing through the first boss 971a, the top face 747 of the display unit case 740, and the top face 737 of the display case 730 from the top left of the door 1000, a second fixing member passing through the first boss 971a, the top face 747 of the display unit case 740, and the top face 737 of the display case 730 from the top right of the door 1000, a third fixing member passing through the second boss 972a, the bottom face 748 of the display unit case 740, and the bottom face 738 of the display case 730 from the bottom left of the door 1000, and a fourth fixing member passing through the second boss 972a, the bottom face 748 of the display unit case 740, and the bottom face 738 of the display case 730 from the bottom right of the door 1000. The fixing member 800 is, however, not limited to four in number.

Figure 27:
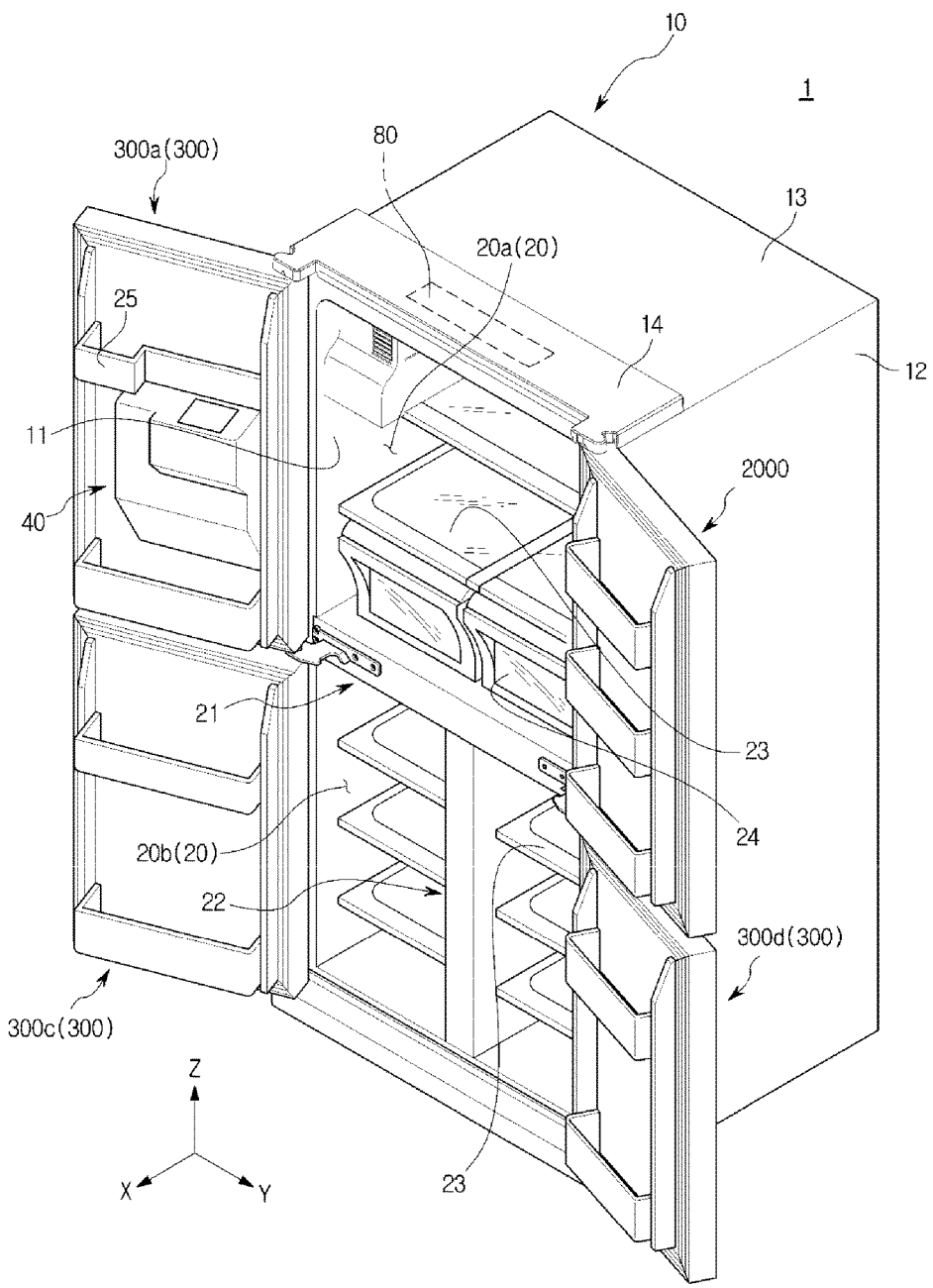
FIG. 27 is a perspective view of a refrigerator with the doors open, according to another embodiment of the present disclosure.
Figure 28:
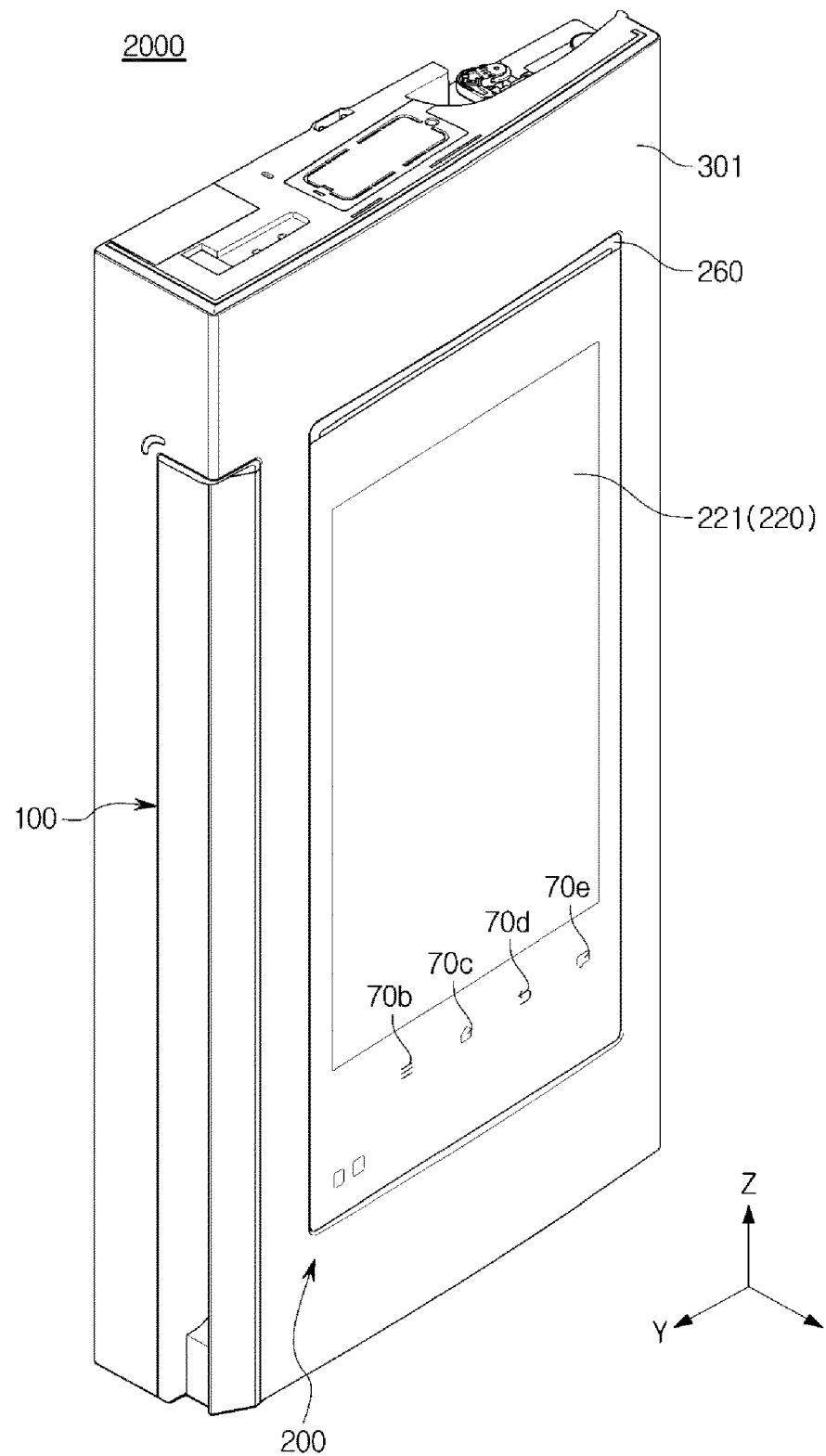
FIG. 28 is a perspective view of a door of a refrigerator with a display built in the door, according to another embodiment of the present disclosure.
Figure 29:
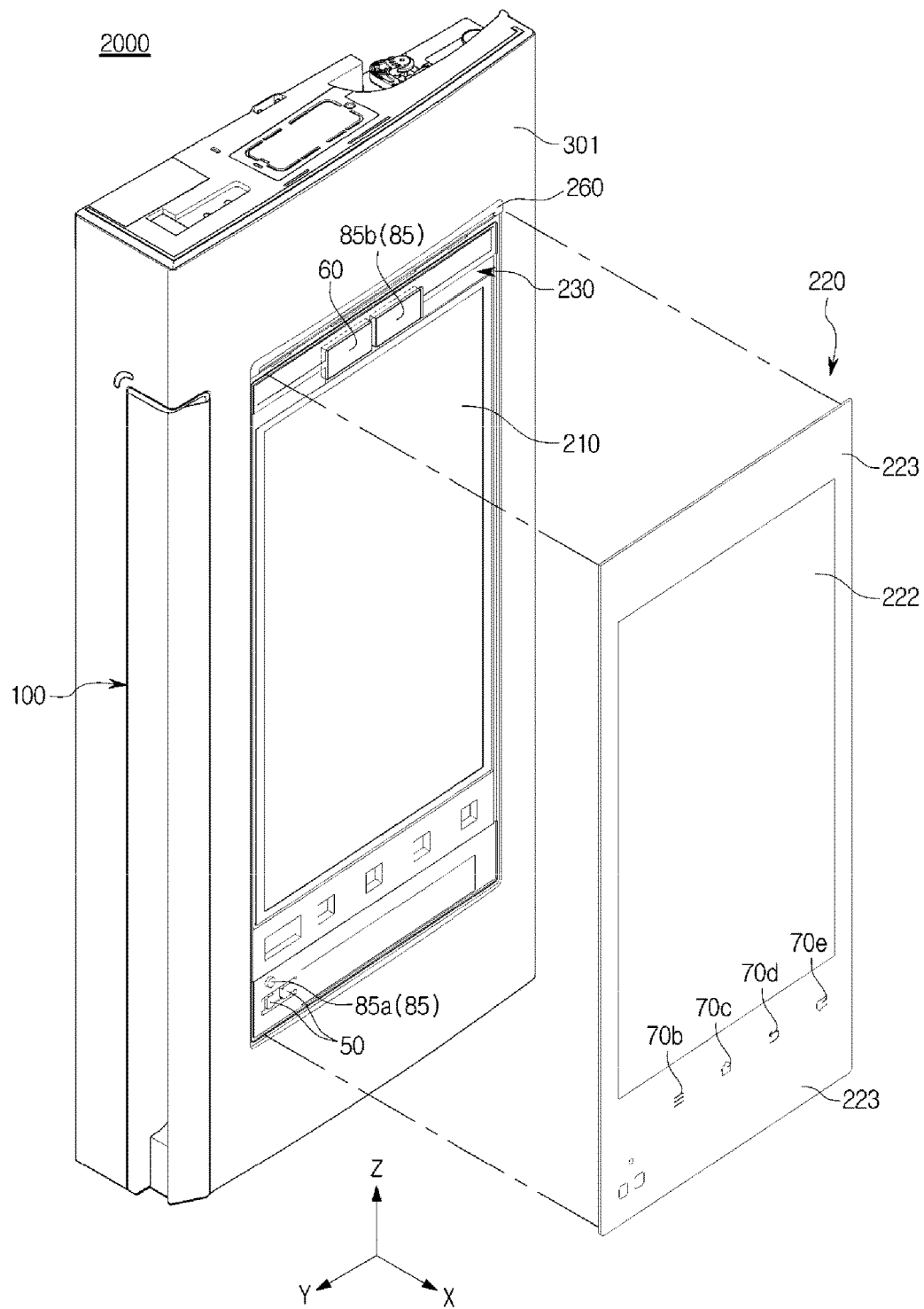
FIG. 29 is a perspective view of a door of a refrigerator with a display glass removed therefrom to show the arrangement of embedded structures, according to another embodiment of the present disclosure.

FIG. 27 is a perspective view of a refrigerator with the doors open, according to another embodiment of the present disclosure, and FIG. 28 is a perspective view of a door of a refrigerator with a display built in the door, according to another embodiment of the present disclosure. FIG. 29 is a perspective view of a door of a refrigerator with a display glass detached therefrom to show the arrangement of embedded structures, according to another embodiment of the present disclosure. What are overlapped with FIGS. 1 to 21 will be omitted in the following description. Furthermore, the elements of the same names as those in FIGS. 1 to 21 will be denoted by the same reference numerals.

As shown in FIGS. 27 and 29, the display unit 200 may include the display 210 for displaying images or videos. The display 210 may further include an LCD.

The display unit 200 may further include the display glass 220.

The display glass 220 may be located on the front of the display 210. The touch screen 221 may be formed on the display glass 220.

How to form the touch screen 221 on the display glass 220 is the same as what is described above in connection with FIGS. 4 and 5, so the description will be omitted herein.

The display glass 220 may have an area larger than the display 210. As such, using the display glass 220 having an area larger than the display 210 may secure a room for placing extra components without encroaching on the display 210.

Explaining this from a different perspective, the display glass 220 may include the first area 222 and the second area 223.

The first area 222 may be an area corresponding to the display 210.

The second area 223 may be an area other than the first area 222. Since the second area 223 is shielded through the printing process, various components may be arranged on the rear side of the second area 223. The arrangement relations among the various components will be described in more detail later.

At least one input icon may be placed on the display glass 220. The at least one input icon may include, for example, a list icon 70b to arrange various lists related to functions of the refrigerator 1, a home icon 70c to go back to a start screen, a back icon 70d to go back to the previous stage, and an information icon 70e to provide information about overall functions of the refrigerator 1 or the display unit 200.

The at least one input icon may be formed on the display glass 220. Preferably, the at least one input icon may be formed in the second area 223 below the first area 222 so as to not interfere with the image or video displayed on the display 210.

The refrigerator 1 may further include the proximity detection sensor 50 for activating the display 210 when it is determined that the user is approaching by sensing whether the user is approaching. If the user approaches to within a certain range, the proximity detection sensor 50 detects the approaching of the user and sends the detection signal to the microcomputer 90, which in turn activates the display 210. The proximity detection sensor 50 may be arranged behind the display glass 220. Specifically, the proximity detection sensor 50 may be arranged behind the second area 223 of the display glass 220 to face the second area 223 of the display glass 220. Preferably, the proximity detection sensor 50 may be arranged behind the second area 223 below the first area 222. The proximity detection sensor 50 may be arranged on the front of the display case 230 facing the display glass 220.

The refrigerator 1 may further include the communication module 80. With the communication module 80, the refrigerator 1 may access the Internet. The refrigerator 1 with the communication module 80 may surf the Internet using the touch screen 221. Furthermore, the refrigerator 1 with the communication module 80 may receive a control command from outside over the Internet. Moreover, if at least one home appliance is connected over a network, the refrigerator with the communication module 80 may also serve as a home network server for performing centralized control over the at least one home appliance. In other words, the refrigerator 1 with the communication module 80 may allow the user to be able to input an Internet command or control command for the refrigerator 1 by manipulating the touch screen 221. The Internet command or the control command for the refrigerator 1 input through the touch screen 221 is forwarded to the microcomputer 90, which in turn displays a web page connected over the Internet or a result of processing the control command on the display 210. The communication module 80 may include, for example, at least one of Wi-Fi, Bluetooth, Zigbee, and Z-wave. The communication module 80 may be equipped in the main body 10 of the refrigerator 1. Specifically, the communication module 80 may be equipped inside the top cover 14. The top cover 14 may be detachably connected on the top face 13 of the main body 10 that forms the top exterior of the refrigerator 1.

The refrigerator 1 may further include the camera 60 capable of taking pictures of people or things. The camera 60 may also be used in video calls using the refrigerator 1. An image or video clip taken by the camera 60 is displayed on the display 210. The camera 60 may be arranged behind the display glass 220. Specifically, the camera 60 may be arranged behind the second area 223 of the display glass 220 to face the second area 223 of the display glass 220. Preferably, the camera 60 may be arranged behind the second area 223 above the first area 222. The camera 60 may be arranged on the front of the display case 230 facing the display glass 220.

The refrigerator 1 may further include at least one microphone 85 to implement a voice recognition function. A voice command input through the at least one microphone 85 is sent to the microcomputer 90, which in turn controls the display 210 to display a result of the voice command. The at least one microphone 85 may be arranged behind the display glass 220. Specifically, the at least one microphone 85 may be arranged behind the second area 223 of the display glass 220 to face the second area 223 of the display glass 220. The at least one microphone 85 may include at least one of the first microphone 85a arranged behind the second area 223 below the first area 222 and the second microphone 85b arranged behind the second area 223 above the first area 222. The at least one microphone 85 may be arranged on the front of the display case 230 facing the display glass 220.

In the following description, assume that the proximity detection sensor 50, the camera 60, and the at least one microphone 85 are arranged on the front of the display case 230 such that all of them are located behind the second area 223 of the display glass 220, and the communication module 80 is arranged in the main body 10 to be contained inside the top cover 14.

As shown in FIG. 29, the proximity detection sensor 50 and the first microphone 85a may be arranged on the front of the display case 230 to be located below the display 210. The camera 60 and the second microphone 85b may be arranged on the front of the display case 230 to be located above the display 210. The reason why it is desirable to arrange the proximity detection sensor 50 in the front bottom part of the display case 230 is to be able to even detect whether a user having small height like a child is approaching. The arrangement of the proximity detection sensor 50, the communication module 80, the at least one microphone 85, and the camera 60 is not limited to the example, but may be modified in various ways.

Figure 30:
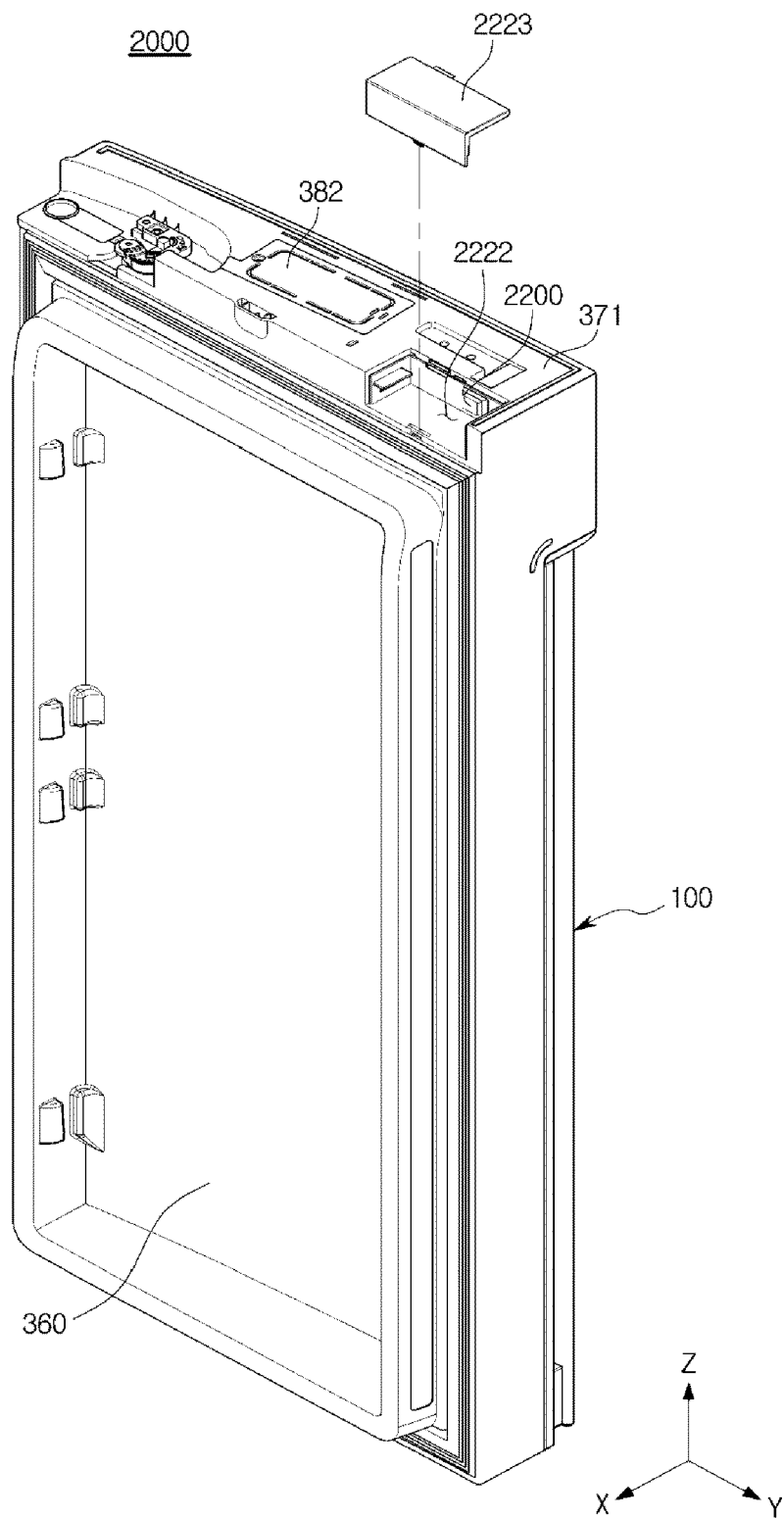
FIG. 30 is a perspective view of a door of a refrigerator with a display built in the door at a different angle from that of FIG. 28, according to another embodiment of the present disclosure.

FIG. 30 is a perspective view of a door of a refrigerator with a display built in the door at a different angle from that of FIG. 28, according to another embodiment of the present disclosure. FIG. 30 shows a USB port connected to a port cover 2200 to protect the USB port against foreign materials, such as dust. What are overlapped with FIGS. 1 to 21 will be omitted in the following description. Furthermore, the elements of the same names as those in FIGS. 1 to 21 will be denoted by the same reference numerals.

As shown in FIG. 30, the microcomputer 90 of the refrigerator 1, especially, a memory unit (not shown) of the microcomputer 90 and a USP port to transmit/receive data may be installed in a door 2000. The USB port may be installed on the top of the door 2000. Specifically, the USB port may be installed on the first door cap 371 among the plurality of door caps 371, 372. The USB port may be mounted in an internal space 2222 defined by the top of the door 2000 and a cover 2223 detachably connected on the top of the door 2000. That is, the cover 2223 may be detachably connected to the first door cap 371. The cover 2223 may prevent foreign materials like dust from permeating to the USB port together with the port cover 2200. The cover 2223 may also minimize possible effects the presence of the USB port affects the appearance of the door 2000 or the refrigerator 1 by preventing the USB port from being exposed at ordinary times. The port cover 2200 may be detachably connected to the USB port to protect the USB port against foreign material, such as dust.

The user removes the cover 2223 from the door 2000, and then removes the port cover 2200 connected to the USB port. After that, the user connects an USB (not shown) to the USB port. When the USB port recognizes the USB, data communication is made between the USB and the microcomputer 90 of the refrigerator 1.

Figure 31:
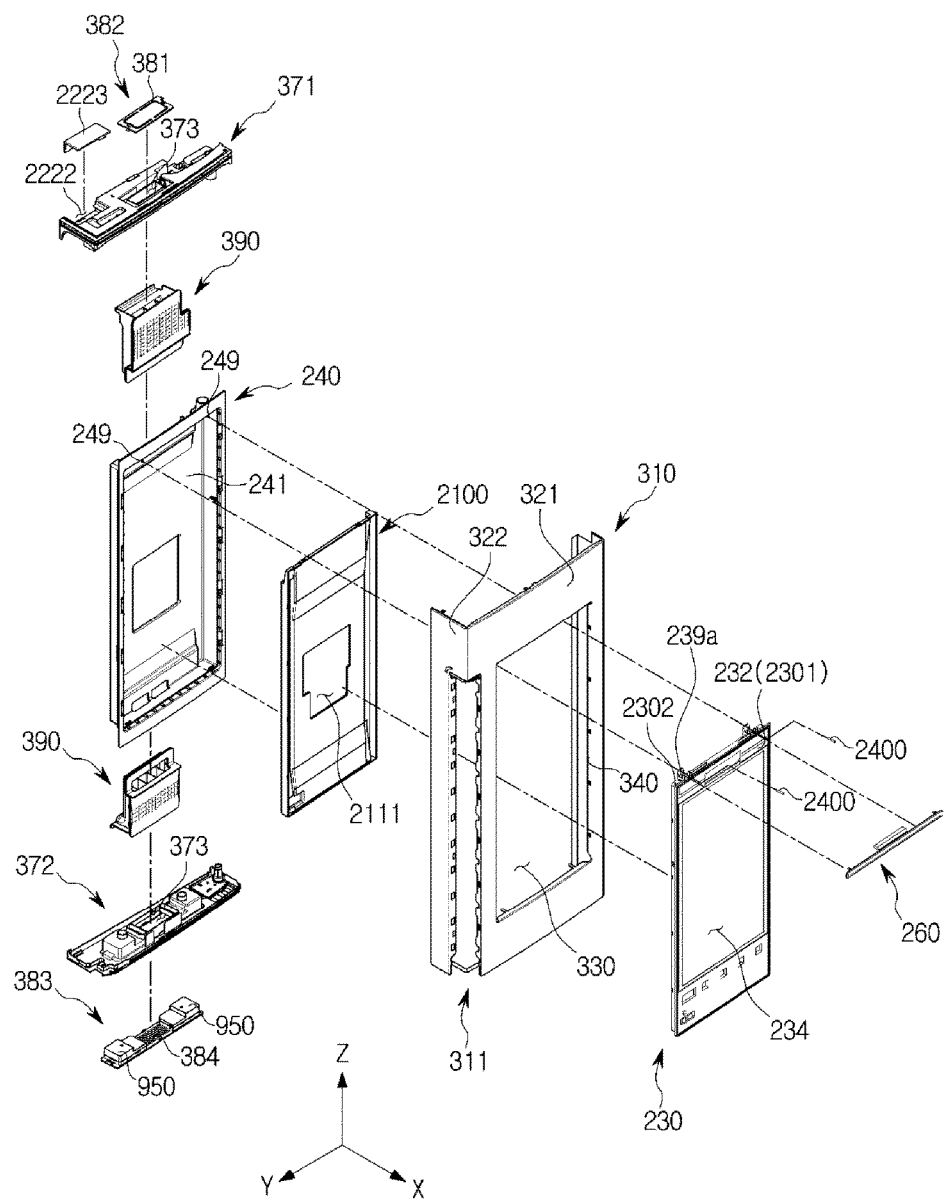
FIG. 31 is an exploded view illustrating combination relations between a display unit case and a display case by a fixing member in a refrigerator, according to another embodiment of the present disclosure.
Figure 32:
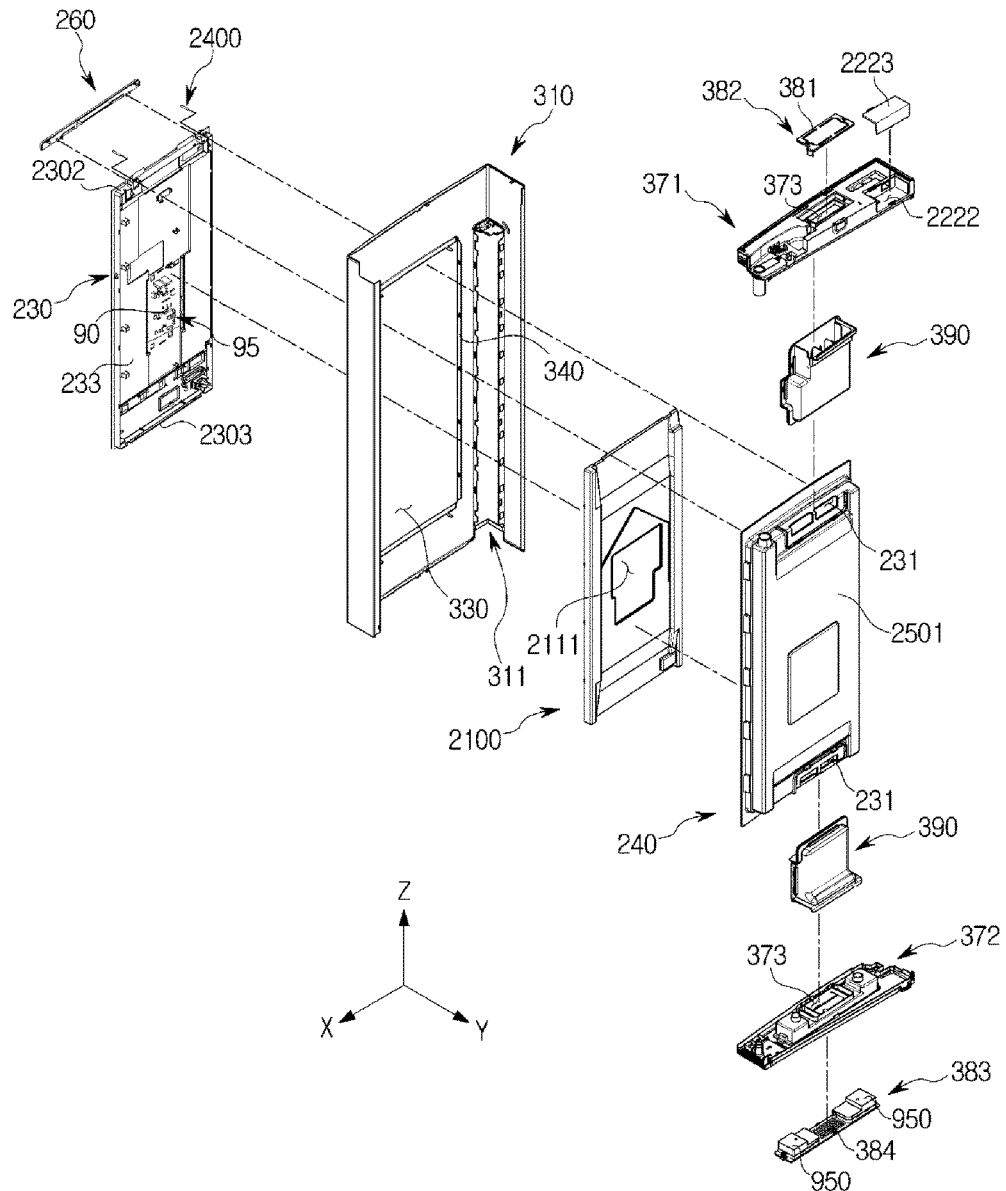
FIG. 32 is an exploded view illustrating combination relations between the display unit case and the display case by the fixing member in the refrigerator, which are viewed at a different angle from the angle of FIG. 31, according to another embodiment of the present disclosure.
Figure 33:
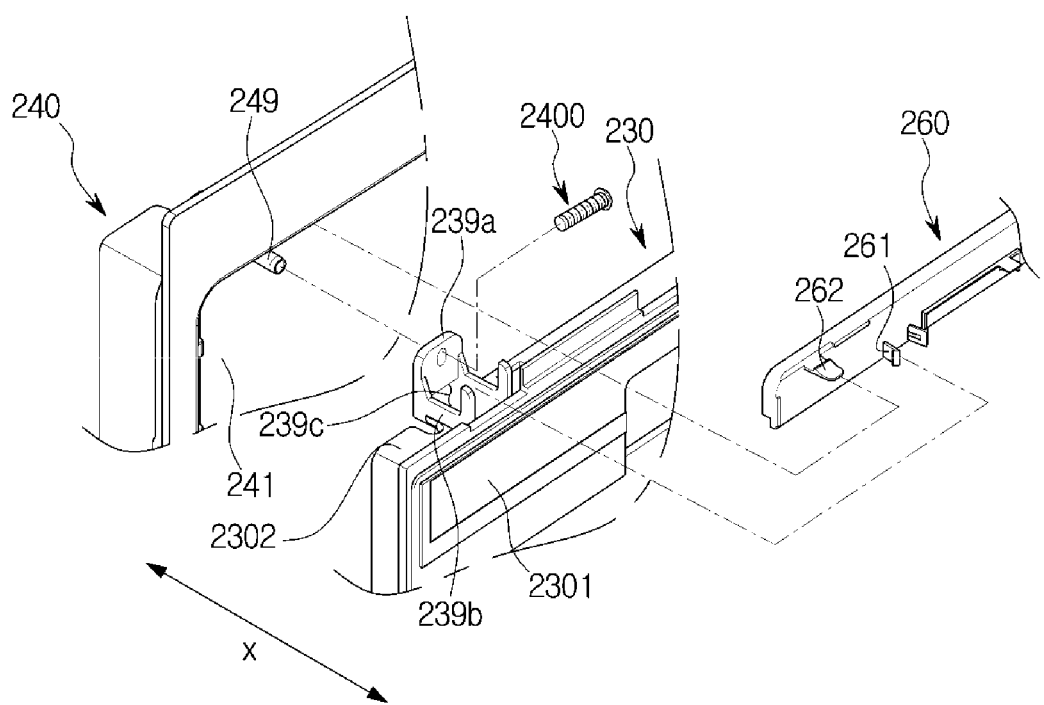
FIG. 33 is an enlarged view illustrating combination relations between a display unit case and a display case by a fixing member in a refrigerator, according to another embodiment of the present disclosure.

FIG. 31 is an exploded view illustrating combination relations between a display unit case and a display case by a fixing member in a refrigerator, according to another embodiment of the present disclosure, and FIG. 32 is an exploded view illustrating combination relations between the display unit case and the display case by the fixing member in the refrigerator, viewed at a different angle from FIG. 31, according to another embodiment of the present disclosure. FIG. 33 is an enlarged view illustrating combination relations between a display unit case and a display case by a fixing member in a refrigerator, according to another embodiment of the present disclosure. What are overlapped with FIGS. 1 to 21 will be omitted in the following description. Furthermore, the elements of the same names as those in FIGS. 1 to 21 will be denoted by the same reference numerals. Some of the embedded components are omitted in FIGS. 31 and 32.

As shown in FIGS. 31 to 33, the door 2000 may include the door frame 310.

The door frame 310 may form the exterior of the door 2000. Specifically, the door frame 310 may include a front part 321 forming the front exterior of the door 2000, and side parts 322 forming the side exterior of the door 2000. As will be described later, the top exterior of the door 2000 may be formed by the first door cap 371, and the bottom exterior of the door 2000 may be formed by the second door cap 372. Furthermore, the rear exterior of the door 2000 may be formed by the door panel 360.

The door frame 310 may include the display unit mounter 330 in which the display unit 200 is mounted. Specifically, the display unit case 240 may be mounted in the display unit mounter 330. The display unit mounter 330 may be formed on the front part 321 of the door frame 310.

The door frame 310 is the same as what is described with reference to FIGS. 15 to 21, so the description about the door frame 310 will be omitted herein.

The door panel 360 is also the same as what is described with reference to FIGS. 15 to 21, so the description about the door panel 360 will be omitted herein.

The door 2000 may further include the plurality of door caps 371,372. The plurality of door caps 371, 372 may include the first door cap 371 connected on the top of the door frame 310 and the second door cap 372 connected on the bottom of the door frame 310. An air flow unit 373 may be formed in the plurality of door caps 371, 372.

The door 2000 may further include the plurality of door cap covers 380. The plurality of door cap covers 380 may be connected to the plurality of door caps 371, 372 to cover the air flow unit 373. At least one slit 381 may be formed in the plurality of door cap covers 380 to pass air. Furthermore, a grid-like air passage 384 may be formed in the plurality of door cap covers 380 to pass air. The plurality of door cap covers 380 may include the first door cap cover 382 connected to the first door cap 371 and the second door cap cover 383 connected to the second door cap 372. At least one slit 381 may be formed in the first door cap cover 382, and the grid-like air passage 384 may be formed in the second door cap cover 383.

The door 2000 may further include the plurality of ducts 390 to release heat generated from the display unit 200. The plurality of ducts 390 may be arranged inside the door 2000. The plurality of ducts 390 may be arranged inside the door 2000 to connect the air flow unit 373 formed in the plurality of door caps 371, 372 and the air move unit 231 formed in the display unit case 240. The at least one slit 381, the air passage 384, the air move unit 231, the plurality of ducts 390, the air flow unit 373, and an opening 2111 formed in a circuit board cover 2100 may be connected together to pass air.

Explaining from a different perspective, the refrigerator 1 may further include a heat radiation structure. The heat radiation structure may be arranged inside the door 2000 to radiate heat generated from the display unit 200. The heat radiation structure may include the air move unit 231 formed in the unit case 240, the plurality of ducts 390, the air flow unit 373 formed in the plurality of door caps 371, 372, at least one slit 381 formed in the plurality of door cap covers 380, the air passage 384, and the opening 2111 formed in the circuit board cover 2100. The air inside and outside the door 2000 may circulate through the heat radiation structure, and the heat generated from the display unit 200 may be released out of the door 2000 during the air circulation.

The refrigerator 1 may further include the display unit 200. The display unit 200 may be installed in the door 2000.

The display unit 200 may include the display 210 for displaying images. The display 210 may further include an LCD.

The display unit 200 may further include the display glass 220. The display glass 220 is the same as what is described with reference to FIGS. 15 to 21, so the description about the display glass 220 will be omitted herein.

The display unit 200 may further include the display case 230 with the display mounter 234 for the display 210 to be mounted therein.

The display case 230 may include a first face 232 directed forward of the refrigerator 1, and a second face 233 directed backward of the refrigerator 1.

The display mounter 234 may be formed to be sunken from the first face 232. Furthermore, embedded parts, such as the proximity detection sensor 50 may be arranged on the first face 232.

At least one circuit board 95 including the microcomputer 90 may be arranged in the display case 230. The at least one circuit board 95 including the microcomputer 90 may be arranged on the second face 233 of the display case 230.

The display case 230 may include a body 2301 in which the display mounter 234 is arranged. Furthermore, the display case 230 may further include a top face 2302 formed on the top of the body 2301 and a bottom face 2303 formed on the bottom of the body 2301.

The display case 230 may include at least one fixing member fastener 239a. The at least one fixing member fastener 239a may be formed on the top face 2302 of the display case 230. The at least one fixing member fastener 239a may be formed by being extended upward from the display case 230. Specifically, the at least one fixing member fastener 239a may be formed by being extended upward from the top face 2302 of the display case 230. A fixing member 2400 may be fixedly connected to at least one fixing member combiner 249, which will be described later, by passing through the at least one fixing member fastener 239a.

The display case 230 may further include a combining piece mounter 239b in which a combining piece 261 of the combining cover 260 is mounted. The combining piece mounter 239b may be formed integrally with the at least one fixing member fastener 239a. In other words, the combining piece mounter 239b may be formed on the top face 2302 of the display case 230 to extend forward of the door 2000 from the at least one fixing member fastener 239a. The combining piece mounter 239b may include a dent 239c, and the combining piece 261 of the combining cover 260 may be detachably mounted in the dent 239c of the combining piece mounter 239b.

The display unit 200 may further include the display unit case 240 fixedly connected to the door 2000. Specifically, the display unit case 240 may be fixedly connected on the back of the door frame 310.

The display unit case 240 may have the form of a box with the front open to contain the circuit board cover 2100 and the display case 230. That is, the circuit board cover 2100 and the display case 230 may be settled inside the display unit case 240.

The display unit case 240 may include a base 2501 facing the body 2301.

The display unit case 240 may further include at least one fixing member combiner 249. The at least one fixing member combiner 249 may be arranged in the display unit case 240 to correspond to the at least one fixing member fastener 239a. The at least one fixing member combiner 249 may extend from the base 2501 of the display unit case 240 to protrude forward of the door 2000. The at least one fixing member combiner 249 may have the form of a boss.

The display unit case 240 may further include a fastening piece mounter (not shown) in which the fastening piece 262 of the combining cover 260 is mounted. The fastening piece mounter may be formed on the top of the at least one fixing member combiner 249.

The display unit 200 may further include the circuit board cover 2100. The circuit board cover 2100 may be arranged between the display unit case 240 and the display case 230. The circuit board cover 2100 may be fixedly connected to at least one of the display unit case 240, the door frame 310, and the display case 230. An opening 2111 may be formed in the circuit board cover 2100. The opening 2111 may serve as a heat radiating structure. For example, heat generated from the circuit board 95 may radiate to the outside of the door 2000 by passing through the opening 2111, the air move unit 231, the duct 390, the air flow unit 373, and the at least one slit 381, or by passing through the opening 2111, the air move unit 231, the duct 390, the air flow unit 373, and the air passage 384.

The display unit 200 may further include the combining cover 260. The combining cover 260 is designed for convenience of assembling of the display unit 200. The combining cover 260 may be detachably connected to the display case 230 and the display unit case 240. The display case 230 and the display unit case 240 may be assembled by a fixing member 2400 in the front-and-back direction X of the door 2000 after removal of the combining cover 260. A method of combining the display unit case 240 and the display case 230 in the front-and-back direction X of the door 2000 will be described in detail later.

If the display case 240 and the display unit case 230 are connected in the front-and-back direction X of the door 2000, the display unit 200 has a different appearance from the display unit 200 shown in FIG. 1.

The dent 224 of the display glass 220 and the dent 238 of the display case 230 may be omitted. Accordingly, the display unit 200 may have a smarter design in appearance. Furthermore, it makes it easy to assemble the display case 230 and the display unit case 240.

The display unit 200 may further include a fixing member 2400 for fixedly combining the display unit case 240 and the display case 230 in the front-and-back direction X of the door 2000. The fixing member 2400 may include a screw.

The fixing member 2400 may fixedly combine the display case 230 and the display unit case 240 in the front-and-back direction X of the door 2000. Specifically, the fixing member 2400 may be fixedly connected to at least one fixing member combiner 249 of the display unit case 240 by passing through the at least one fixing member fastener 239a of the display case 230.

A procedure of assembling the door 2000 equipped with the display unit 200 will now be described schematically.

The handle 100 is connected to the handle mounter 311 of the door frame 310. The display unit case 240 is then connected to the door frame 310 such that the display unit case 240 is located behind the door frame 310. The insert frame 340 of the door frame 310 is guided into the insert space 244 by the plurality of guide projections 247 formed in the display unit case 240, and the plurality of latches 246 formed in the display unit case 240 are hooked into the plurality of combiners 350 formed in the insert frame 340. After completion of combining the display unit case 240 and the door frame 310, the plurality of door caps 371, 372 and the door panel 360 are connected to the door frame 310. Then, after the display 210 is mounted in the display mounter 234 of the display case 230, the display glass 220 is attached to the display case 230 such that the display glass 220 is located in front of the display 210. After that, the circuit board cover 2100 and the display case 230 are placed inside the display unit case 240 such that the circuit board cover 2100 and the display case 230 are located in front of the display unit case 240. Further, using the fixing member 2400 fixedly connected to the at least one fixing member combiner 249 of the display unit case 240 by passing through the at least one fixing member fastener 239a of the display case 230, the display case 230 and the display unit case 240 are fixedly connected in the front-and-back direction X of the door 2000. After completion of the combination of the display case 230 and the display unit case 240 using the fixing member 2400, the combining cover 260 is connected on the front of the door 2000 not to expose the internal structures of the door 2000 to the outside. The combining cover 260 may be connected on the front of the door 2000 to be located on the top of the display glass 220. In this regard, the combining piece 261 of the combining cover 260 is connected to the combining piece mounter 239b of the display case 230, and the fastening piece 262 of the combining cover 260 is connected to the fastening piece mounter of the display unit case 240.

The refrigerator 1 may further include at least one speaker 950. The at least one speaker 950 may be installed inside the door 2000. Specifically, the at least one speaker 950 may be installed on the lower part of the door 2000. In other words, the at least one speaker 950 may be installed between the second door cap 372 and the second door cap cover 383. Explaining this from a different perspective, the at least one speaker 950 may be installed in at least one of the second door cap 372 and the second door cap cover 383.

The idea of the present disclosure may be generally applied to refrigerators with pivoting doors in any types, such as 4-door types, Side by Side (SBS) types, Top Mounted Freezer (TMF) types, Bottom Mounted Freezer (BMF) types, French Door Refrigerator (FDR) types, one door types, etc.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:
1. A refrigerator comprising:
   a main body;
   a storeroom arranged inside the main body with an open front;
   a door pivotally connected to the main body for opening or closing the open front of the storeroom; and
   a display device installed on the door,
   wherein the display device comprises:
      a display to display images,
      a display case with a display mounter for the display to be mounted therein,
      a display device case fixedly connected to the door, and
      a fixing member to fixedly couple the display case to the display device case upon pressing a part of the display case.
2. The refrigerator of claim 1, further comprising:
   a pressing piece formed on a back of the display case facing the display device case to extend from the back of the display case,
   wherein the pressing piece is fixedly connected into a fixing groove formed inside the display device case by being pressed by the fixing member.
3. The refrigerator of claim 1, wherein the fixing member comprises:
   a fixed body fixed on a back of the display case facing the display device case; and
   a pressing member for pressing a pressing piece formed to extend from the back of the display case, toward the outside of the refrigerator, by passing through the fixed body.
4. The refrigerator of claim 3, wherein the display device case comprises:
   a base; and
   a plurality of side walls formed along a circumference of the base to protrude in a direction forward from the refrigerator,
   wherein the plurality of side walls comprise:
      an inner wall, on which a fixing groove is formed to be fixedly connected to the pressing piece; and
      an outer wall formed to enclose the inner wall from outside of the inner wall.
5. The refrigerator of claim 1, wherein the door comprises a door frame,
   wherein the door frame comprises:
      a display device mounter in which the display device is mounted;
      an insert frame extending from an edge of the display device mounter toward a back of the refrigerator; and
      a plurality of combiners formed in the insert frame.
6. The refrigerator of claim 5, wherein the display device case comprises:
   a base, and
   a plurality of side walls formed along the circumference of the base to protrude in a direction forward from the refrigerator.
7. The refrigerator of claim 6, wherein the plurality of side walls comprise:
   an inner wall; and an outer wall separately arranged outside of the inner wall to have an insert space, to which the insert frame is inserted, formed between the inner wall and the outer wall, wherein a plurality of latches are formed on at least one of an inner side of the outer wall facing the inner wall and an outer side of the inner wall facing the outer wall to be connected to the plurality of combiners.

8. The refrigerator of claim 7, wherein a plurality of guide projections are formed on at least one of the inner side of the outer wall facing the inner wall and the outer side of the inner wall facing the outer wall to guide insertion of the insert frame to the insert space.

9. The refrigerator of claim 5, wherein the door further comprises a door panel having a face facing the storeroom and connected to the door frame, and wherein the door frame, the display device case mounted in the display device mounter, and the door panel form an insulation space filled with an insulation material.

10. The refrigerator of claim 5, wherein the door frame further includes a handle mounter in which a handle is mounted, and wherein the handle mounter comprises
an opening, to which a part of the handle is insertable; and
combining frames fixedly connected to the handle and arranged separately from each other with the opening between the combining frames.

11. The refrigerator of claim 10, wherein the combining frame comprises a first combining frame fixedly connected to a part of the handle in the front-and-back direction of the refrigerator; and a second combining frame fixedly connected to another part of the handle in the left-and-right direction of the refrigerator.

12. The refrigerator of claim 1, wherein the display device further comprises a display glass located on the front of the display to have an area larger than the display and form a touch screen, wherein the display glass comprises
a first area corresponding to the display, and
a second area other than the first area,
wherein the refrigerator further comprises a communication module arranged behind the second area to face the second area for transmitting and receiving electromagnetic waves.

13. The refrigerator of claim 1, further comprising:

a proximity detection sensor installed in the bottom part of the display case to activate the display when determining that a user is approaching by detecting whether the user is approaching.

14. The refrigerator of claim 12, wherein the door comprises a door frame having a display device mounter in which the display device is mounted, and wherein the display glass is attached onto the display case to form the front exterior of the door together with the door frame.

15. The refrigerator of claim 14, wherein the display glass is attached onto the display case to be separated by a certain distance toward the inside of the door from an edge of the display device mounter.

* * * * *